(12) United States Patent
Chui et al.

(10) Patent No.: US 8,045,252 B2
(45) Date of Patent: Oct. 25, 2011

(54) SPATIAL LIGHT MODULATOR WITH INTEGRATED OPTICAL COMPENSATION STRUCTURE

(75) Inventors: Clarence Chui, San Jose, CA (US); Jeffrey B. Sampsell, Pueblo West, CO (US); William J. Cummings, Millbrae, CA (US); Ming-Hau Tung, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/034,499

(22) Filed: Feb. 20, 2008

(65) Prior Publication Data
US 2008/0151347 A1  Jun. 26, 2008

Related U.S. Application Data

(63) Continuation of application No. 11/036,965, filed on Jan. 14, 2005, now Pat. No. 7,342,705.

(60) Provisional application No. 60/541,607, filed on Feb. 3, 2004, provisional application No. 60/613,482, filed on Sep. 27, 2004, provisional application No. 60/613,536, filed on Sep. 27, 2004, provisional application No. 60/613,542, filed on Sep. 27, 2004.

(51) Int. Cl.
G02B 26/00 (2006.01)
G02F 1/33 (2006.01)

(52) U.S. Cl. .................... 359/238; 359/290; 359/308

(58) Field of Classification Search .................. 359/238, 359/290–292, 237, 298, 308
See application file for complete search history.

(56) References Cited

U.S. PATENT DOCUMENTS

| | | | |
|---|---|---|---|
| 2,518,647 | A | 8/1950 | Teeple et al. |
| 2,534,846 | A | 12/1950 | Ambrose et al. |
| 2,677,714 | A | 5/1954 | Max |
| 3,247,392 | A | 4/1966 | Thelen |
| 3,439,973 | A | 4/1969 | Paul et al. |

(Continued)

FOREIGN PATENT DOCUMENTS

CA  2490975  1/2004

(Continued)

OTHER PUBLICATIONS

International Search Report of PCT Application No. PCT-US2005-002986.

(Continued)

*Primary Examiner* — Dawayne A Pinkney
(74) *Attorney, Agent, or Firm* — Knobbe Martens Olson & Bear LLP

(57) ABSTRACT

A spatial light modulator comprises an integrated optical compensation structure, e.g., an optical compensation structure arranged between a substrate and a plurality of individually addressable light-modulating elements, or an optical compensation structure located on the opposite side of the light-modulating elements from the substrate. The individually addressable light-modulating elements are configured to modulate light transmitted through or reflected from the transparent substrate. Methods for making such spatial light modulators involve fabricating an optical compensation structure over a substrate and fabricating a plurality of individually addressable light-modulating elements over the optical compensation structure. The optical compensation structure may be a passive optical compensation structure. The optical compensation structure may include one or more of a supplemental frontlighting source, a diffuser, a black mask, a diffractive optical element, a color filter, an anti-reflective layer, a structure that scatters light, a microlens array, and a holographic film.

34 Claims, 5 Drawing Sheets

U.S. PATENT DOCUMENTS

| | | | |
|---|---|---|---|
| 3,443,854 A | 5/1969 | Weiss |
| 3,448,334 A | 6/1969 | Frost |
| 3,653,741 A | 4/1972 | Marks |
| 3,656,836 A | 4/1972 | de Cremoux et al. |
| 3,679,313 A | 7/1972 | Rosenberg |
| 3,725,868 A | 4/1973 | Malmer, Jr. et al. |
| 3,813,265 A | 5/1974 | Marks |
| 3,886,310 A | 5/1975 | Guldberg |
| 3,955,880 A | 5/1976 | Lierke |
| 4,099,854 A | 7/1978 | Decker et al. |
| 4,200,472 A | 4/1980 | Chappell |
| 4,228,437 A | 10/1980 | Shelton |
| 4,287,449 A | 9/1981 | Takeda et al. |
| 4,377,324 A | 3/1983 | Durand et al. |
| 4,389,096 A | 6/1983 | Hori et al. |
| 4,400,577 A | 8/1983 | Spear |
| 4,403,248 A | 9/1983 | Te Velde |
| 4,421,381 A | 12/1983 | Ueda et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | Te Velde |
| 4,519,676 A | 5/1985 | Te Velde |
| 4,531,126 A | 7/1985 | Sadones |
| 4,633,031 A | 12/1986 | Todorof |
| 4,663,083 A | 5/1987 | Marks |
| 4,681,403 A | 7/1987 | Te Velde et al. |
| 4,748,366 A | 5/1988 | Taylor |
| 4,786,128 A | 11/1988 | Birnbach |
| 4,790,635 A | 12/1988 | Apsley |
| 4,832,459 A | 5/1989 | Harper |
| 4,850,682 A | 7/1989 | Gerritsen |
| 4,859,060 A | 8/1989 | Katagiri et al. |
| 4,863,224 A | 9/1989 | Afian |
| 4,918,577 A | 4/1990 | Furudate |
| 4,961,617 A | 10/1990 | Shahidi |
| 4,974,942 A | 12/1990 | Gross |
| 4,980,775 A | 12/1990 | Brody |
| 4,982,184 A | 1/1991 | Kirkwood |
| 5,022,745 A | 6/1991 | Zahowski et al. |
| 5,037,173 A | 8/1991 | Sampsell et al. |
| 5,044,736 A | 9/1991 | Jaskie et al. |
| 5,075,796 A | 12/1991 | Schildkraut et al. |
| 5,110,370 A | 5/1992 | Vogeli et al. |
| 5,124,834 A | 6/1992 | Cusano et al. |
| 5,142,414 A | 8/1992 | Koehler |
| 5,151,585 A | 9/1992 | Siebert |
| 5,151,801 A | 9/1992 | Hiroshima |
| 5,153,771 A | 10/1992 | Link et al. |
| 5,164,858 A | 11/1992 | Aguilera, Jr. et al. |
| 5,168,406 A | 12/1992 | Nelson et al. |
| 5,192,946 A | 3/1993 | Thompson et al. |
| 5,221,982 A | 6/1993 | Faris |
| 5,231,532 A | 7/1993 | Magel et al. |
| 5,233,385 A | 8/1993 | Sampsell |
| 5,261,970 A | 11/1993 | Landis et al. |
| 5,287,215 A | 2/1994 | Warde et al. |
| 5,289,300 A | 2/1994 | Yamazaki |
| 5,291,314 A | 3/1994 | Agranat |
| 5,293,272 A | 3/1994 | Jannson et al. |
| 5,311,360 A | 5/1994 | Bloom et al. |
| 5,326,426 A | 7/1994 | Tam et al. |
| 5,341,242 A | 8/1994 | Gilboa et al. |
| 5,345,322 A | 9/1994 | Fergason et al. |
| 5,356,488 A | 10/1994 | Hezel |
| 5,365,283 A | 11/1994 | Doherty et al. |
| 5,381,253 A | 1/1995 | Sharp et al. |
| 5,398,125 A | 3/1995 | Willett et al. |
| 5,398,170 A | 3/1995 | Lee |
| 5,401,983 A | 3/1995 | Jokerst et al. |
| 5,448,314 A | 9/1995 | Heimbuch et al. |
| 5,448,659 A | 9/1995 | Tsutsui et al. |
| 5,452,385 A | 9/1995 | Izumi |
| 5,459,610 A | 10/1995 | Bloom et al. |
| 5,467,417 A | 11/1995 | Nakamura |
| 5,474,865 A | 12/1995 | Vasudev |
| 5,497,172 A | 3/1996 | Doherty et al. |
| 5,500,635 A | 3/1996 | Mott |
| 5,500,761 A | 3/1996 | Goossen et al. |
| 5,515,184 A | 5/1996 | Caulfield |
| 5,517,347 A | 5/1996 | Sampsell |
| 5,550,373 A | 8/1996 | Cole et al. |
| 5,579,149 A | 11/1996 | Moret et al. |
| 5,594,830 A | 1/1997 | Winston |
| 5,606,441 A | 2/1997 | Florence et al. |
| 5,615,024 A | 3/1997 | May et al. |
| 5,619,059 A | 4/1997 | Li et al. |
| 5,619,365 A | 4/1997 | Rhoades et al. |
| 5,619,366 A | 4/1997 | Rhoads et al. |
| 5,633,739 A | 5/1997 | Matsuyama |
| 5,636,052 A | 6/1997 | Arney et al. |
| 5,638,084 A | 6/1997 | Kalt |
| 5,647,036 A | 7/1997 | Deacon et al. |
| 5,650,865 A | 7/1997 | Smith |
| 5,659,410 A | 8/1997 | Koike |
| 5,671,314 A | 9/1997 | Gregory et al. |
| 5,671,994 A | 9/1997 | Tai |
| 5,703,667 A | 12/1997 | Ochiai |
| 5,703,710 A | 12/1997 | Brinkman et al. |
| 5,710,656 A | 1/1998 | Goossen |
| 5,712,694 A | 1/1998 | Taira et al. |
| 5,731,857 A | 3/1998 | Neijzen |
| 5,735,590 A | 4/1998 | Kashima |
| 5,739,945 A | 4/1998 | Tayebati |
| 5,745,281 A | 4/1998 | Yi et al. |
| 5,754,260 A | 5/1998 | Ooi |
| 5,771,124 A | 6/1998 | Kintz |
| 5,771,321 A | 6/1998 | Stern |
| 5,782,993 A | 7/1998 | Ponewash |
| 5,782,995 A | 7/1998 | Nanya et al. |
| 5,783,614 A | 7/1998 | Chen |
| 5,805,117 A | 9/1998 | Mazurek |
| 5,810,464 A | 9/1998 | Ishikawa |
| 5,815,229 A | 9/1998 | Shapiro et al. |
| 5,835,255 A | 11/1998 | Miles |
| 5,845,035 A | 12/1998 | Wimberger-Friedl |
| 5,853,310 A | 12/1998 | Nishimura |
| 5,854,872 A | 12/1998 | Tai |
| 5,868,480 A | 2/1999 | Zeinali |
| 5,877,874 A | 3/1999 | Rosenberg |
| 5,886,688 A | 3/1999 | Fifield |
| 5,892,598 A | 4/1999 | Asakawa et al. |
| 5,913,594 A | 6/1999 | Iimura |
| 5,914,804 A | 6/1999 | Goossen |
| 5,920,417 A | 7/1999 | Johnson |
| 5,933,183 A * | 8/1999 | Enomoto et al. ............... 347/241 |
| 5,959,763 A | 9/1999 | Bozler et al. |
| 5,982,540 A | 11/1999 | Koike |
| 5,986,796 A | 11/1999 | Miles et al. |
| 5,991,073 A | 11/1999 | Woodgate et al. |
| 5,999,239 A | 12/1999 | Larson |
| 6,002,829 A | 12/1999 | Winston |
| 6,008,449 A | 12/1999 | Cole |
| 6,014,192 A | 1/2000 | Lehureau |
| 6,028,690 A | 2/2000 | Carter et al. |
| 6,031,653 A | 2/2000 | Wang et al. |
| 6,040,937 A | 3/2000 | Miles |
| 6,046,840 A | 4/2000 | Huibers |
| 6,048,071 A | 4/2000 | Sawayama |
| 6,049,317 A | 4/2000 | Thompson et al. |
| 6,055,090 A | 4/2000 | Miles |
| 6,072,620 A | 6/2000 | Shiono |
| 6,073,034 A | 6/2000 | Jacobsen |
| 6,088,102 A | 7/2000 | Manhart |
| 6,091,469 A | 7/2000 | Naito |
| 6,094,285 A | 7/2000 | Wickham et al. |
| 6,113,239 A | 9/2000 | Sampsell et al. |
| 6,151,089 A | 11/2000 | Yang et al. |
| 6,195,196 B1 | 2/2001 | Kimura et al. |
| 6,196,691 B1 | 3/2001 | Ochiai |
| 6,201,633 B1 | 3/2001 | Peeters et al. |
| 6,211,976 B1 | 4/2001 | Popovich |
| 6,232,937 B1 | 5/2001 | Jacobsen |
| 6,243,149 B1 | 6/2001 | Swanson et al. |
| 6,259,082 B1 | 7/2001 | Fujimoto et al. |
| 6,282,010 B1 | 8/2001 | Sulzbach et al. |
| 6,283,602 B1 | 9/2001 | Kawaguchi et al. |

| | | |
|---|---|---|
| 6,285,424 B1 | 9/2001 | Yoshida |
| 6,288,824 B1 | 9/2001 | Kastalsky |
| 6,292,504 B1 | 9/2001 | Halmos |
| 6,300,558 B1 | 10/2001 | Takamoto |
| 6,301,000 B1 | 10/2001 | Johnson |
| 6,322,236 B1 | 11/2001 | Campbell et al. |
| 6,323,415 B1 | 11/2001 | Uematsu et al. |
| 6,323,892 B1 | 11/2001 | Mihara |
| 6,323,987 B1 | 11/2001 | Rinaudo |
| 6,342,970 B1 | 1/2002 | Sperger et al. |
| 6,356,378 B1 | 3/2002 | Huibers |
| 6,377,233 B2 | 4/2002 | Colgan et al. |
| 6,377,535 B1 | 4/2002 | Chen et al. |
| 6,381,022 B1 | 4/2002 | Zavracky |
| 6,399,257 B1 | 6/2002 | Shirota et al. |
| 6,400,738 B1 | 6/2002 | Tucker |
| 6,407,785 B1 | 6/2002 | Yamazaki |
| 6,412,969 B1 | 7/2002 | Torihara |
| 6,448,709 B1 | 9/2002 | Chuang et al. |
| 6,456,279 B1 | 9/2002 | Kubo |
| 6,466,354 B1 | 10/2002 | Gudeman |
| 6,466,358 B2 | 10/2002 | Tew |
| 6,483,613 B1 | 11/2002 | Woodgate et al. |
| 6,493,475 B1 | 12/2002 | Lin |
| 6,494,588 B1 | 12/2002 | Okada |
| 6,519,073 B1 | 2/2003 | Goossen |
| 6,520,643 B1 | 2/2003 | Holman et al. |
| 6,522,794 B1 | 2/2003 | Bischel et al. |
| 6,538,813 B1 | 3/2003 | Magno et al. |
| 6,540,368 B2 | 4/2003 | Akaoka |
| 6,549,338 B1 | 4/2003 | Wolverton et al. |
| 6,561,661 B2 | 5/2003 | Egawa |
| 6,565,225 B2 | 5/2003 | Mabuchi et al. |
| 6,574,033 B1 * | 6/2003 | Chui et al. .................... 359/291 |
| 6,577,429 B1 | 6/2003 | Kurtz |
| 6,597,419 B1 | 7/2003 | Okada et al. |
| 6,597,490 B2 | 7/2003 | Tayebati |
| 6,598,987 B1 | 7/2003 | Parikka |
| 6,624,944 B1 | 9/2003 | Wallace et al. |
| 6,630,786 B2 | 10/2003 | Cummings et al. |
| 6,636,322 B1 | 10/2003 | Terashita |
| 6,636,653 B2 | 10/2003 | Miracky et al. |
| 6,642,913 B1 | 11/2003 | Kimura et al. |
| 6,643,067 B2 | 11/2003 | Miyamae et al. |
| 6,643,069 B2 | 11/2003 | Dewald |
| 6,646,772 B1 | 11/2003 | Popovich et al. |
| 6,650,455 B2 * | 11/2003 | Miles ........................ 359/237 |
| 6,657,700 B2 | 12/2003 | Sako et al. |
| 6,659,615 B2 | 12/2003 | Umemoto |
| 6,667,782 B1 | 12/2003 | Taira et al. |
| 6,669,350 B2 | 12/2003 | Yamashita |
| 6,674,562 B1 | 1/2004 | Miles |
| 6,680,792 B2 | 1/2004 | Miles |
| 6,683,693 B1 | 1/2004 | Otsuka et al. |
| 6,693,690 B2 | 2/2004 | Umemoto |
| 6,696,140 B2 | 2/2004 | Suzuki |
| 6,709,123 B2 | 3/2004 | Flohr |
| 6,738,194 B1 | 5/2004 | Ramirez et al. |
| 6,741,377 B2 | 5/2004 | Miles |
| 6,742,921 B2 | 6/2004 | Umemoto |
| 6,760,135 B1 | 7/2004 | Payne |
| 6,760,146 B2 | 7/2004 | Ikeda et al. |
| 6,768,555 B2 | 7/2004 | Chen et al. |
| 6,773,126 B1 | 8/2004 | Hatjasalo et al. |
| 6,774,962 B2 | 8/2004 | Yoon |
| 6,778,746 B2 | 8/2004 | Charlton |
| 6,784,948 B2 | 8/2004 | Kawashima et al. |
| 6,794,119 B2 | 9/2004 | Miles |
| 6,798,469 B2 | 9/2004 | Kimura |
| 6,811,267 B1 | 11/2004 | Allen et al. |
| 6,822,745 B2 | 11/2004 | De Groot et al. |
| 6,822,780 B1 | 11/2004 | Long, Jr. |
| 6,826,000 B2 | 11/2004 | Lee et al. |
| 6,829,258 B1 | 12/2004 | Carlisle |
| 6,841,787 B2 | 1/2005 | Almogy |
| 6,844,959 B2 | 1/2005 | Huibers |
| 6,852,396 B1 | 2/2005 | Mineo |
| 6,867,896 B2 | 3/2005 | Miles |
| 6,870,581 B2 | 3/2005 | Li et al. |
| 6,871,982 B2 | 3/2005 | Holman et al. |
| 6,879,354 B1 | 4/2005 | Sawayama |
| 6,880,959 B2 | 4/2005 | Houston |
| 6,882,458 B2 | 4/2005 | Lin et al. |
| 6,882,461 B1 | 4/2005 | Tsai et al. |
| 6,883,924 B2 | 4/2005 | Maeda et al. |
| 6,883,934 B2 | 4/2005 | Kawakami |
| 6,885,377 B2 | 4/2005 | Lim |
| 6,912,022 B2 | 6/2005 | Lin et al. |
| 6,917,469 B2 | 7/2005 | Momose |
| 6,930,816 B2 | 8/2005 | Mochizuki |
| 6,940,653 B2 | 9/2005 | Favalora et al. |
| 6,960,010 B2 | 11/2005 | Matsumoto et al. |
| 6,967,779 B2 | 11/2005 | Fadel et al. |
| 6,970,031 B1 | 11/2005 | Martin |
| 6,972,827 B2 | 12/2005 | Mi |
| 6,982,820 B2 | 1/2006 | Tsai |
| 6,995,890 B2 | 2/2006 | Lin et al. |
| 6,998,196 B2 | 2/2006 | Rich et al. |
| 6,999,225 B2 | 2/2006 | Lin et al. |
| 6,999,235 B2 | 2/2006 | Nakamura |
| 6,999,236 B2 | 2/2006 | Lin et al. |
| 7,002,726 B2 | 2/2006 | Patel |
| 7,004,610 B2 | 2/2006 | Yamashita |
| 7,006,272 B2 | 2/2006 | Tsai |
| 7,009,754 B2 * | 3/2006 | Huibers ........................ 359/291 |
| 7,012,659 B2 | 3/2006 | Smith et al. |
| 7,016,095 B2 | 3/2006 | Lin |
| 7,018,088 B2 | 3/2006 | Yu |
| 7,019,734 B2 | 3/2006 | Cross et al. |
| 7,030,949 B2 | 4/2006 | Kashima |
| 7,034,981 B2 | 4/2006 | Makigaki |
| 7,038,752 B2 | 5/2006 | Lin |
| 7,042,643 B2 | 5/2006 | Miles |
| 7,046,409 B2 | 5/2006 | Kihara |
| 7,050,219 B2 | 5/2006 | Kimura |
| 7,056,001 B2 | 6/2006 | Chuang |
| 7,064,875 B2 | 6/2006 | Kawano et al. |
| 7,068,948 B2 | 6/2006 | Wei et al. |
| 7,072,093 B2 | 7/2006 | Piehl et al. |
| 7,072,096 B2 | 7/2006 | Holman et al. |
| 7,092,163 B2 | 8/2006 | Bastawros et al. |
| 7,099,058 B2 | 8/2006 | Takemori et al. |
| 7,110,158 B2 | 9/2006 | Miles |
| 7,113,339 B2 | 9/2006 | Taguchi et al. |
| 7,123,216 B1 | 10/2006 | Miles |
| 7,126,738 B2 | 10/2006 | Miles |
| 7,128,459 B2 | 10/2006 | Igarashi et al. |
| 7,133,022 B2 | 11/2006 | Grabert |
| 7,138,984 B1 * | 11/2006 | Miles ........................ 345/173 |
| 7,142,347 B2 | 11/2006 | Islam |
| 7,156,546 B2 | 1/2007 | Higashiyama |
| 7,161,728 B2 | 1/2007 | Sampsell et al. |
| 7,161,730 B2 | 1/2007 | Floyd |
| 7,172,915 B2 | 2/2007 | Lin et al. |
| 7,187,489 B2 | 3/2007 | Miles |
| 7,218,429 B2 | 5/2007 | Batchko |
| 7,218,812 B2 | 5/2007 | Maxwell |
| 7,221,418 B2 | 5/2007 | Lee |
| 7,223,010 B2 | 5/2007 | Min |
| 7,236,663 B2 | 6/2007 | Wakita et al. |
| 7,262,916 B2 | 8/2007 | Kao |
| 7,304,784 B2 | 12/2007 | Chui |
| 7,324,248 B2 | 1/2008 | Brotherton-Ratcliffe et al. |
| 7,336,329 B2 | 2/2008 | Yoon |
| 7,342,705 B2 | 3/2008 | Chui et al. |
| 7,342,709 B2 | 3/2008 | Lin |
| 7,349,139 B2 | 3/2008 | Chui |
| 7,349,141 B2 | 3/2008 | Tung |
| 7,352,501 B2 | 4/2008 | Chopra et al. |
| 7,355,780 B2 | 4/2008 | Chui |
| 7,359,011 B2 | 4/2008 | Hamada |
| 7,360,899 B2 | 4/2008 | McGuire |
| 7,369,292 B2 | 5/2008 | Xu et al. |
| 7,369,294 B2 | 5/2008 | Gally |
| 7,372,449 B2 | 5/2008 | Kodama et al. |
| 7,372,631 B2 | 5/2008 | Ozawa |
| 7,375,779 B2 | 5/2008 | Lee et al. |
| 7,376,308 B2 | 5/2008 | Cheben et al. |

| | | |
|---|---|---|
| 7,380,970 B2 | 6/2008 | Hwang |
| 7,385,748 B2 | 6/2008 | Miles |
| 7,400,439 B2 | 7/2008 | Holman |
| 7,403,180 B1 | 7/2008 | Silverstein et al. |
| 7,417,735 B2 | 8/2008 | Cummings |
| 7,417,784 B2 | 8/2008 | Sasagawa |
| 7,420,638 B2 | 9/2008 | Tasaka et al. |
| 7,450,295 B2 | 11/2008 | Tung |
| 7,456,805 B2 | 11/2008 | Ouderkirk |
| 7,463,421 B2 | 12/2008 | Miles |
| 7,498,621 B2 | 3/2009 | Seitz |
| 7,508,571 B2 | 3/2009 | Gally |
| 7,520,642 B2 | 4/2009 | Holman et al. |
| 7,561,323 B2 | 7/2009 | Gally |
| 7,564,612 B2 | 7/2009 | Chui |
| 7,603,001 B2 | 10/2009 | Wang |
| 7,630,123 B2 | 12/2009 | Kothari |
| 7,643,203 B2 | 1/2010 | Gousev et al. |
| 7,688,494 B2 | 3/2010 | Xu et al. |
| 7,701,029 B2 | 4/2010 | Mabuchi |
| 7,706,050 B2 | 4/2010 | Sampsell |
| 7,710,632 B2 | 5/2010 | Cummings |
| 7,710,636 B2 | 5/2010 | Chui |
| 7,719,500 B2 | 5/2010 | Chui |
| 7,719,747 B2 | 5/2010 | Tung |
| 7,733,439 B2 | 6/2010 | Sampsell |
| 7,750,886 B2 | 7/2010 | Sampsell |
| 7,777,954 B2 | 8/2010 | Gruhlke |
| 7,807,488 B2 | 10/2010 | Gally |
| 7,813,026 B2 | 10/2010 | Sampsell |
| 7,813,029 B2 | 10/2010 | Kothari et al. |
| 7,845,841 B2 | 12/2010 | Sampsell |
| 7,848,001 B2 | 12/2010 | Miles |
| 7,855,824 B2 | 12/2010 | Gally |
| 7,855,827 B2 | 12/2010 | Xu |
| 7,864,395 B2 | 1/2011 | Chui |
| 7,880,954 B2 | 2/2011 | Sampsell |
| 7,898,521 B2 | 3/2011 | Gally |
| 7,907,319 B2 | 3/2011 | Miles |
| 7,911,428 B2 | 3/2011 | Gally |
| 7,916,378 B2 | 3/2011 | Wang |
| 7,933,475 B2 | 4/2011 | Wang |
| 2001/0003504 A1 | 6/2001 | Ishihara |
| 2001/0010952 A1 | 8/2001 | Abramovich |
| 2001/0019380 A1 | 9/2001 | Ishihara |
| 2001/0019479 A1 | 9/2001 | Nakabayashi et al. |
| 2001/0026001 A1 | 10/2001 | Yagi |
| 2001/0030861 A1 | 10/2001 | Oda |
| 2001/0049061 A1 | 12/2001 | Nakagaki et al. |
| 2001/0055208 A1 | 12/2001 | Kimura |
| 2002/0006036 A1 | 1/2002 | Egawa |
| 2002/0008969 A1 | 1/2002 | Mabuchi et al. |
| 2002/0024711 A1 | 2/2002 | Miles |
| 2002/0034071 A1 | 3/2002 | Mabuchi |
| 2002/0050286 A1 | 5/2002 | Kubota |
| 2002/0054258 A1 | 5/2002 | Kondo |
| 2002/0075245 A1 | 6/2002 | Kawashima |
| 2002/0075555 A1* | 6/2002 | Miles ................... 359/290 |
| 2002/0080465 A1* | 6/2002 | Han et al. ............. 359/291 |
| 2002/0105699 A1 | 8/2002 | Miracky et al. |
| 2002/0106182 A1 | 8/2002 | Kawashima |
| 2002/0126364 A1 | 9/2002 | Miles |
| 2002/0131151 A1 | 9/2002 | Engler et al. |
| 2002/0135560 A1 | 9/2002 | Akaoka |
| 2002/0149584 A1 | 10/2002 | Simpson |
| 2002/0154256 A1 | 10/2002 | Gotoh |
| 2002/0167730 A1 | 11/2002 | Needham et al. |
| 2002/0172039 A1 | 11/2002 | Inditsky |
| 2003/0006730 A1 | 1/2003 | Tachibana |
| 2003/0011864 A1 | 1/2003 | Flanders |
| 2003/0016930 A1 | 1/2003 | Inditsky |
| 2003/0043157 A1 | 3/2003 | Miles |
| 2003/0067760 A1 | 4/2003 | Jagt |
| 2003/0081154 A1 | 5/2003 | Coleman |
| 2003/0083429 A1 | 5/2003 | Smith |
| 2003/0090887 A1 | 5/2003 | Igarashi |
| 2003/0095401 A1 | 5/2003 | Hanson |
| 2003/0103177 A1 | 6/2003 | Maeda |
| 2003/0103344 A1 | 6/2003 | Niida |
| 2003/0107692 A1 | 6/2003 | Sekiguchi |
| 2003/0136759 A1 | 7/2003 | Mikolas |
| 2003/0151821 A1 | 8/2003 | Favalora et al. |
| 2003/0160919 A1 | 8/2003 | Suzuki et al. |
| 2003/0161040 A1 | 8/2003 | Ishii |
| 2003/0165067 A1 | 9/2003 | Imamura |
| 2003/0169385 A1 | 9/2003 | Okuwaki |
| 2003/0179383 A1 | 9/2003 | Chen et al. |
| 2003/0184690 A1 | 10/2003 | Ogiwara |
| 2003/0193630 A1 | 10/2003 | Chiou |
| 2003/0206281 A1 | 11/2003 | Jain |
| 2003/0210222 A1 | 11/2003 | Ogiwara |
| 2003/0210363 A1 | 11/2003 | Yasukawa et al. |
| 2003/0210367 A1 | 11/2003 | Nakano |
| 2003/0213514 A1 | 11/2003 | Ortabasi |
| 2003/0214621 A1 | 11/2003 | Kim et al. |
| 2003/0222857 A1 | 12/2003 | Abileah |
| 2003/0231483 A1 | 12/2003 | Higashiyama |
| 2004/0001169 A1 | 1/2004 | Saiki |
| 2004/0017599 A1 | 1/2004 | Yang |
| 2004/0027315 A1 | 2/2004 | Senda et al. |
| 2004/0027339 A1 | 2/2004 | Schulz |
| 2004/0027636 A1 | 2/2004 | Miles |
| 2004/0032401 A1 | 2/2004 | Nakazawa |
| 2004/0032659 A1 | 2/2004 | Drinkwater |
| 2004/0051929 A1 | 3/2004 | Sampsell et al. |
| 2004/0061946 A1 | 4/2004 | Yoshikawa |
| 2004/0066477 A1 | 4/2004 | Morimoto et al. |
| 2004/0070711 A1 | 4/2004 | Wen et al. |
| 2004/0080807 A1 | 4/2004 | Chen et al. |
| 2004/0080938 A1 | 4/2004 | Holman et al. |
| 2004/0085748 A1 | 5/2004 | Sugiura |
| 2004/0115339 A1 | 6/2004 | Ito |
| 2004/0125048 A1 | 7/2004 | Fukuda et al. |
| 2004/0125281 A1 | 7/2004 | Lin et al. |
| 2004/0174583 A1 | 9/2004 | Chen et al. |
| 2004/0175577 A1 | 9/2004 | Lin et al. |
| 2004/0184134 A1 | 9/2004 | Makigaki |
| 2004/0188150 A1 | 9/2004 | Richard et al. |
| 2004/0188599 A1 | 9/2004 | Viktorovitch |
| 2004/0207995 A1 | 10/2004 | Park |
| 2004/0217264 A1 | 11/2004 | Wood |
| 2004/0217919 A1 | 11/2004 | Piehl et al. |
| 2004/0218251 A1 | 11/2004 | Piehl et al. |
| 2004/0218390 A1 | 11/2004 | Holman et al. |
| 2004/0233357 A1 | 11/2004 | Fujimori |
| 2004/0246743 A1 | 12/2004 | Lee |
| 2005/0002082 A1 | 1/2005 | Miles |
| 2005/0010568 A1 | 1/2005 | Nagatomo |
| 2005/0024890 A1 | 2/2005 | Yamamoto |
| 2005/0035699 A1 | 2/2005 | Tsai |
| 2005/0036095 A1 | 2/2005 | Yeh et al. |
| 2005/0042117 A1 | 2/2005 | Lin |
| 2005/0057442 A1 | 3/2005 | Way |
| 2005/0069209 A1 | 3/2005 | Damera-Venkata et al. |
| 2005/0069254 A1 | 3/2005 | Schultheis |
| 2005/0117623 A1 | 6/2005 | Shchukin |
| 2005/0120553 A1 | 6/2005 | Brown |
| 2005/0133761 A1 | 6/2005 | Thielemans |
| 2005/0141065 A1 | 6/2005 | Masamoto |
| 2005/0146897 A1 | 7/2005 | Mimura |
| 2005/0195370 A1 | 9/2005 | Gore |
| 2005/0195462 A1 | 9/2005 | Lin |
| 2005/0206802 A1 | 9/2005 | Creemers |
| 2005/0207016 A1 | 9/2005 | Ando |
| 2005/0212738 A1 | 9/2005 | Gally |
| 2005/0224694 A1 | 10/2005 | Yaung |
| 2005/0231977 A1 | 10/2005 | Hayakawa |
| 2005/0231981 A1 | 10/2005 | Hoelen et al. |
| 2005/0259939 A1 | 11/2005 | Rinko |
| 2005/0271325 A1 | 12/2005 | Anderson |
| 2005/0286113 A1 | 12/2005 | Miles |
| 2006/0001942 A1 | 1/2006 | Chui |
| 2006/0002141 A1 | 1/2006 | Ouderkirk |
| 2006/0022966 A1 | 2/2006 | Mar |
| 2006/0028708 A1 | 2/2006 | Miles |
| 2006/0051048 A1 | 3/2006 | Gardiner |
| 2006/0062016 A1 | 3/2006 | Dejima |
| 2006/0066511 A1 | 3/2006 | Chui |

| | | |
|---|---|---|
| 2006/0066541 A1 | 3/2006 | Gally et al. |
| 2006/0066557 A1 | 3/2006 | Floyd |
| 2006/0066586 A1 | 3/2006 | Gally et al. |
| 2006/0066599 A1 | 3/2006 | Chui |
| 2006/0066935 A1 | 3/2006 | Cummings et al. |
| 2006/0067600 A1 | 3/2006 | Gally et al. |
| 2006/0067633 A1 | 3/2006 | Gally et al. |
| 2006/0067651 A1 | 3/2006 | Chui |
| 2006/0073623 A1 | 4/2006 | Conley |
| 2006/0077122 A1 | 4/2006 | Gally et al. |
| 2006/0077124 A1 | 4/2006 | Gally |
| 2006/0077127 A1 | 4/2006 | Sampsell |
| 2006/0077146 A1 | 4/2006 | Plamateer |
| 2006/0077149 A1 | 4/2006 | Gally |
| 2006/0077154 A1 | 4/2006 | Gally et al. |
| 2006/0077509 A1 | 4/2006 | Tung et al. |
| 2006/0077512 A1 | 4/2006 | Cummings |
| 2006/0077514 A1 | 4/2006 | Sampsell |
| 2006/0077522 A1 | 4/2006 | Kothari |
| 2006/0077523 A1 | 4/2006 | Cummings et al. |
| 2006/0103912 A1 | 5/2006 | Katoh |
| 2006/0109682 A1 | 5/2006 | Ko et al. |
| 2006/0110090 A1 | 5/2006 | Ellwood |
| 2006/0126142 A1 | 6/2006 | Choi |
| 2006/0130889 A1 | 6/2006 | Li et al. |
| 2006/0132383 A1 | 6/2006 | Gally et al. |
| 2006/0181903 A1 | 8/2006 | Okuwaki |
| 2006/0198013 A1 | 9/2006 | Sampsell |
| 2006/0209012 A1 | 9/2006 | Hagood |
| 2006/0209385 A1 | 9/2006 | Liu |
| 2006/0215958 A1 | 9/2006 | Yeo |
| 2006/0227532 A1 | 10/2006 | Ko et al. |
| 2006/0262279 A1 | 11/2006 | Miles |
| 2006/0274243 A1 | 12/2006 | Iijima et al. |
| 2006/0274400 A1 | 12/2006 | Miles |
| 2006/0279558 A1 | 12/2006 | Van Delden et al. |
| 2006/0286381 A1 | 12/2006 | Naito |
| 2007/0042524 A1 | 2/2007 | Kogut |
| 2007/0064294 A1 | 3/2007 | Hoshino et al. |
| 2007/0132843 A1 | 6/2007 | Miles |
| 2007/0133935 A1 | 6/2007 | Fine |
| 2007/0147087 A1 | 6/2007 | Parker |
| 2007/0187852 A1 | 8/2007 | Parker et al. |
| 2007/0196040 A1 | 8/2007 | Wang et al. |
| 2007/0201234 A1 | 8/2007 | Ottermann |
| 2007/0206267 A1 | 9/2007 | Tung |
| 2007/0210163 A1 | 9/2007 | Han |
| 2007/0229936 A1 | 10/2007 | Miles |
| 2007/0236774 A1 | 10/2007 | Gousev |
| 2007/0247704 A1 | 10/2007 | Mignard |
| 2007/0253054 A1 | 11/2007 | Miles |
| 2008/0049450 A1 | 2/2008 | Sampsell |
| 2008/0084600 A1 | 4/2008 | Bita et al. |
| 2008/0090025 A1 | 4/2008 | Freking |
| 2008/0100900 A1 | 5/2008 | Chui |
| 2008/0112039 A1 | 5/2008 | Chui |
| 2008/0137175 A1 | 6/2008 | Lin |
| 2008/0180956 A1 | 7/2008 | Gruhlke |
| 2008/0218834 A1 | 9/2008 | Wang |
| 2008/0266333 A1 | 10/2008 | Silverstein et al. |
| 2009/0050454 A1 | 2/2009 | Matsukawa |
| 2009/0059346 A1 | 3/2009 | Xu |
| 2009/0073540 A1 | 3/2009 | Kothari |
| 2009/0086301 A1 | 4/2009 | Gally |
| 2009/0090611 A1 | 4/2009 | Zeijlon |
| 2009/0096956 A1 | 4/2009 | Uehara et al. |
| 2009/0097100 A1 | 4/2009 | Gally |
| 2009/0101192 A1 | 4/2009 | Kothari |
| 2009/0101623 A1 | 4/2009 | Bita et al. |
| 2009/0103166 A1 | 4/2009 | Khazeni et al. |
| 2009/0126777 A1 | 5/2009 | Khazeni et al. |
| 2009/0126792 A1 | 5/2009 | Gruhlke |
| 2009/0147332 A1 | 6/2009 | Bita et al. |
| 2009/0147535 A1 | 6/2009 | Mienko |
| 2009/0151771 A1 | 6/2009 | Kothari |
| 2009/0168459 A1 | 7/2009 | Holman |
| 2009/0190373 A1 | 7/2009 | Bita et al. |
| 2009/0199893 A1 | 8/2009 | Bita |
| 2009/0199900 A1 | 8/2009 | Bita |
| 2009/0201565 A1 | 8/2009 | Bita et al. |
| 2009/0201571 A1 | 8/2009 | Gally |
| 2009/0225394 A1 | 9/2009 | Chui |
| 2009/0231877 A1 | 9/2009 | Mienko |
| 2009/0242024 A1 | 10/2009 | Kothari |
| 2009/0251752 A1 | 10/2009 | Gruhlke |
| 2009/0255569 A1 | 10/2009 | Sampsell |
| 2009/0257108 A1 | 10/2009 | Gruhlke |
| 2009/0293955 A1 | 12/2009 | Kothari |
| 2009/0293995 A1 | 12/2009 | Kothari |
| 2009/0296194 A1 | 12/2009 | Gally |
| 2009/0310208 A1 | 12/2009 | Wang |
| 2009/0323144 A1 | 12/2009 | Gruhlke |
| 2009/0323153 A1 | 12/2009 | Sampsell |
| 2010/0026727 A1 | 2/2010 | Bita et al. |
| 2010/0096006 A1 | 4/2010 | Griffiths |
| 2010/0096011 A1 | 4/2010 | Griffiths |
| 2010/0141557 A1 | 6/2010 | Gruhlke |
| 2010/0149624 A1 | 6/2010 | Kothari |
| 2010/0165443 A1 | 7/2010 | Chui |
| 2010/0172012 A1 | 7/2010 | Sampsell |
| 2010/0214642 A1 | 8/2010 | Miles |
| 2010/0238529 A1 | 9/2010 | Sampsell et al. |
| 2010/0245370 A1 | 9/2010 | Narayanan |
| 2010/0245975 A1 | 9/2010 | Cummings |
| 2010/0302616 A1 | 12/2010 | Bita |
| 2010/0302802 A1 | 12/2010 | Bita |
| 2010/0302803 A1 | 12/2010 | Bita |
| 2010/0309540 A1 | 12/2010 | Miles |
| 2011/0025727 A1 | 2/2011 | Li |
| 2011/0043889 A1 | 2/2011 | Mignard |
| 2011/0075246 A1 | 3/2011 | Wang |

FOREIGN PATENT DOCUMENTS

| | | |
|---|---|---|
| CN | 1158182 | 8/1997 |
| CN | 1272922 | 11/2000 |
| CN | 1286424 | 3/2001 |
| CN | 1381752 | 11/2002 |
| CN | 1517743 | 8/2004 |
| CN | 1639596 A | 7/2005 |
| CN | 1643439 A | 7/2005 |
| CN | 1755494 A | 4/2006 |
| CN | 1795403 A | 6/2006 |
| DE | 34 02 746 | 8/1985 |
| DE | 3402746 A1 | 8/1985 |
| DE | 196 22 748 | 12/1997 |
| DE | 19622748 | 12/1997 |
| DE | 199 42 513 | 3/2001 |
| DE | 102 28 946 | 1/2004 |
| DE | 103 29 917 A1 | 2/2005 |
| EP | 0 223 136 A | 5/1987 |
| EP | 0 278 038 | 8/1988 |
| EP | 0 590 511 | 4/1994 |
| EP | 0 667 548 | 8/1995 |
| EP | 0 786 911 | 7/1997 |
| EP | 0 822 441 | 2/1998 |
| EP | 0 830 032 | 3/1998 |
| EP | 0 855 745 | 7/1998 |
| EP | 0 867 747 A2 | 9/1998 |
| EP | 0 879 991 | 11/1998 |
| EP | 0 907 050 | 4/1999 |
| EP | 0 957 392 | 11/1999 |
| EP | 1 003 062 | 5/2000 |
| EP | 1 014 161 | 6/2000 |
| EP | 1 081 633 | 3/2001 |
| EP | 1 089 115 | 4/2001 |
| EP | 1 093 105 | 4/2001 |
| EP | 1 122 586 | 8/2001 |
| EP | 1 199 512 | 4/2002 |
| EP | 1 251 454 | 4/2002 |
| EP | 1 271 223 | 6/2002 |
| EP | 1 279 892 | 1/2003 |
| EP | 1 329 664 | 7/2003 |
| EP | 1 336 876 | 8/2003 |
| EP | 1 341 025 | 9/2003 |
| EP | 1 347 315 | 9/2003 |
| EP | 1 389 775 | 2/2004 |
| EP | 1 413 543 | 4/2004 |
| EP | 1 437 610 | 7/2004 |

| | | | | | | |
|---|---|---|---|---|---|---|
| EP | 1 450 418 | 8/2004 | | JP | 2002 062505 A | 2/2002 |
| EP | 1 531 302 | 5/2005 | | JP | 2002 72284 | 3/2002 |
| EP | 1 544 537 | 6/2005 | | JP | 2002 090549 | 3/2002 |
| EP | 1 577 701 | 9/2005 | | JP | 2002-098838 | 4/2002 |
| EP | 1 640 764 | 3/2006 | | JP | 2002-040339 | 6/2002 |
| EP | 1 640 770 | 3/2006 | | JP | 2002-174780 | 6/2002 |
| EP | 1 640 776 | 3/2006 | | JP | 2002 174780 | 6/2002 |
| EP | 1 640 779 | 3/2006 | | JP | 2002 523798 | 7/2002 |
| EP | 1 640 780 | 3/2006 | | JP | 2002-229023 | 8/2002 |
| EP | 1 670 065 A | 6/2006 | | JP | 2002 245835 | 8/2002 |
| EP | 1 734 401 | 12/2006 | | JP | 2002-287047 | 10/2002 |
| EP | 2 051 124 A | 4/2009 | | JP | 2002 287047 | 10/2002 |
| EP | 2 251 731 | 11/2010 | | JP | 2002-297044 | 10/2002 |
| GB | 2 260 203 | 4/1993 | | JP | 2002-328313 | 11/2002 |
| GB | 2278222 | 11/1994 | | JP | 2002-245835 | 12/2002 |
| GB | 2 315 356 | 1/1998 | | JP | 2002-365438 | 12/2002 |
| GB | 2321532 | 7/1998 | | JP | 2003 007114 | 1/2003 |
| JP | 56-010976 | 2/1981 | | JP | 2003-021821 A | 1/2003 |
| JP | 56-010977 | 2/1981 | | JP | 2003 057652 | 2/2003 |
| JP | 60 165621 A | 8/1985 | | JP | 2003 057653 | 2/2003 |
| JP | 62-009317 | 1/1987 | | JP | 2003 066451 | 3/2003 |
| JP | 02-068513 | 3/1990 | | JP | 2003-131215 | 5/2003 |
| JP | 02-151079 A | 6/1990 | | JP | 2003 131215 | 5/2003 |
| JP | 03-199920 | 8/1991 | | JP | 2003-149642 | 5/2003 |
| JP | 04-081816 | 3/1992 | | JP | 2003-149643 | 5/2003 |
| JP | 04-238321 A | 8/1992 | | JP | 2003 173713 | 6/2003 |
| JP | 05-281479 | 10/1993 | | JP | 2003 177336 | 6/2003 |
| JP | 05 281479 | 10/1993 | | JP | 2003 186008 | 7/2003 |
| JP | 06-209114 | 7/1994 | | JP | 2003 195201 | 7/2003 |
| JP | 06-265870 A | 9/1994 | | JP | 2003-315694 | 11/2003 |
| JP | 07-509327 | 10/1995 | | JP | 2004-012918 | 1/2004 |
| JP | 08 018990 | 1/1996 | | JP | 2004-062099 | 2/2004 |
| JP | 08018990 A | 1/1996 | | JP | 2004-111278 | 4/2004 |
| JP | 08 050283 A | 2/1996 | | JP | 2004-510185 | 4/2004 |
| JP | 08 271874 | 10/1996 | | JP | 2004-206049 | 7/2004 |
| JP | 09 022012 | 1/1997 | | JP | 2004-212673 | 7/2004 |
| JP | 09 189869 | 7/1997 | | JP | 2004-212922 | 7/2004 |
| JP | 09-189910 | 7/1997 | | JP | 2004-219843 A | 8/2004 |
| JP | 09-507920 | 8/1997 | | JP | 2005-308871 | 11/2005 |
| JP | 09-260696 | 10/1997 | | JP | 2005-316178 | 11/2005 |
| JP | 09 281917 | 10/1997 | | JP | 2006-065360 A | 3/2006 |
| JP | 09281917 A | 10/1997 | | JP | 2006 099105 | 4/2006 |
| JP | 09 307140 | 11/1997 | | JP | 2006 107993 | 4/2006 |
| JP | 10 500224 | 1/1998 | | JP | 2006 120571 | 5/2006 |
| JP | 10-096910 | 4/1998 | | JP | 2007 027150 | 2/2007 |
| JP | 10 186249 | 7/1998 | | JP | 2009 0300966 | 12/2009 |
| JP | 10 202948 | 8/1998 | | KR | 2002/010322 A | 2/2002 |
| JP | 10 325953 | 12/1998 | | KR | 2003-29769 | 3/2002 |
| JP | 11 002712 | 1/1999 | | KR | 2003-0081662 A | 10/2003 |
| JP | 11 002764 | 1/1999 | | KR | 10-2004-0016570 | 2/2004 |
| JP | 11 064882 | 3/1999 | | RO | 594155 | 6/2004 |
| JP | 11 160687 | 6/1999 | | WO | WO 94/06871 A1 | 3/1994 |
| JP | 11 167808 | 6/1999 | | WO | WO 95-01584 | 1/1995 |
| JP | 11 174234 | 7/1999 | | WO | WO 95-14256 A1 | 5/1995 |
| JP | 11174234 A | 7/1999 | | WO | WO 95/15582 A1 | 6/1995 |
| JP | 11-211999 | 8/1999 | | WO | WO 95-30924 | 11/1995 |
| JP | 11 211999 | 8/1999 | | WO | WO 96-08833 | 3/1996 |
| JP | 11 232919 | 8/1999 | | WO | WO 97/01240 | 1/1997 |
| JP | 11 249132 | 9/1999 | | WO | WO 97/16756 | 5/1997 |
| JP | 11-295726 A | 10/1999 | | WO | WO 97-17628 | 5/1997 |
| JP | 2000-028933 | 1/2000 | | WO | WO 97/44707 A | 11/1997 |
| JP | 2000 500245 | 1/2000 | | WO | WO 97/46908 | 12/1997 |
| JP | 2000-075287 | 3/2000 | | WO | WO 98/32047 | 7/1998 |
| JP | 2000 075293 | 3/2000 | | WO | WO 98/35182 | 8/1998 |
| JP | 2000 147262 | 5/2000 | | WO | WO 99/04296 A | 1/1999 |
| JP | 2000 193933 | 7/2000 | | WO | WO 99-63394 | 12/1999 |
| JP | 2000 214804 | 8/2000 | | WO | WO 99/67680 | 12/1999 |
| JP | 2000-258622 | 9/2000 | | WO | WO 00/11502 | 3/2000 |
| JP | 2000 514568 | 10/2000 | | WO | WO 01/57434 | 8/2001 |
| JP | 2000 193933 | 11/2000 | | WO | WO 01/81994 | 11/2001 |
| JP | 2000 305074 | 11/2000 | | WO | WO 01/84228 | 11/2001 |
| JP | 2000 338310 | 12/2000 | | WO | WO 02/06858 | 1/2002 |
| JP | 2001-283622 | 10/2001 | | WO | WO 02/24570 | 3/2002 |
| JP | 2001 305312 | 10/2001 | | WO | WO 02/071132 | 9/2002 |
| JP | 2001305312 | 10/2001 | | WO | WO 02-071132 A2 | 9/2002 |
| JP | 2001 343514 | 12/2001 | | WO | WO 03/007049 A1 | 1/2003 |
| JP | 2001-343514 A | 12/2001 | | WO | WO 03/032058 | 4/2003 |
| JP | 2001-345458 | 12/2001 | | WO | WO 03/038509 | 5/2003 |
| JP | 2002-062505 | 2/2002 | | WO | WO 03-056876 | 7/2003 |

| WO | WO 03/062912 | 7/2003 |
| WO | WO 03/073151 | 9/2003 |
| WO | WO 03-075207 | 9/2003 |
| WO | WO 03/105198 | 12/2003 |
| WO | WO 2004/006003 | 1/2004 |
| WO | WO 2004/027514 | 4/2004 |
| WO | WO 2004/036270 | 4/2004 |
| WO | WO 2004-068460 | 8/2004 |
| WO | WO 2004/114418 A1 | 12/2004 |
| WO | WO 2005/011012 | 2/2005 |
| WO | WO 2005/076051 | 8/2005 |
| WO | WO 2005/088367 | 9/2005 |
| WO | WO 2006/036451 | 4/2006 |
| WO | WO 2006/036496 | 4/2006 |
| WO | WO 2008/045200 | 4/2008 |
| WO | WO 2008/045207 | 4/2008 |
| WO | WO 2008/045311 | 4/2008 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Conner, "Hybrid Color Display Using Optical Interference Filter Array," SID Digest, pp. 577-580 (1993).
Fan et al., "Channel Drop Filters in Photonic Crystals", Optics Express, vol. 3, No. 1, 1998.
Giles et al., "Silicon MEMS Optical Switch Attenuator and Its Use in Lightwave Subsystems", IEEE Journal of Selected Topics in Quanum Electronics, vol. 5. No. 1, Jan.-Feb. 1999,pp. 18-25.
Goossen et al., "Silicon Modulator Based on Mechanically-Active Anti-Reflection Layer with 1Mbit-sec Capability for Fiber-in-the-Loop Applications," IEEE Photonics Technology Letters, pp. 1119, 1121 (Sep. 1994).
Huang, et al., "Multidirectional Asymmetrical Microlens-Array Light Control Films for High Performance Reflective Liquid Crystal Displays", SID Digest, 2002, pp. 870-873.
Jerman et al., "A Miniature Fabry-Perot Interferometer Fabricated Using Silicon Micromaching Techniques," IEEE Electron Devices Society (1998).
Jerman et al., "A Miniature Fabry-Perot Interferometer with a Corrugated Silicon Diaphragm Support", (1988).
Little et al., "Vertically Coupled Microring Rosonator Channel Dropping Filter", IEEE Photonics Technology Letters, vol. 11, No. 2, 1999.
Magel, "Integrated Optic Devices Using Micromachined Metal Membranes", SPIE vol. 2686, 0-8194-2060-3-1996.
Mehregany et al., "MEMS Applications in Optical Systems", IEEE-LEOS 1996 Summer Topical Meetings, pp. 75-76, (Aug. 5-9, 1996).
Miles, Interferometric Modulation: MOEMS as an enabling technology for high-performance reflective displays, Proceedings of the SPIE, 4985:28, pp. 131-139, Jan. 2003.
Miles, Mark, W., "A New Reflective FPD Technology Using Interferometric Modulation", The Proceedings of the Society for Information Display (May 11-16, 1997).
Miles, et al., Digital Paper for reflective displays, Journal of the Society for Information Display, San Jose, CA, vol. 11, No. 1, 2003, pp. 209-215.
Miles, MW "A MEMS Based Interferometric Modulator (IMOD) for Display Applications" Proceedings of Sensors Expo, Oct. 21, 1997 © 1997 Helmer's Publishing, Inc., pp. 281-284.
Raley et al., "A Fabry-Perot Microinterferometer for Visible Wavelengths," IEEE Solid-State Sensor and Actuator Workshop, Hilton Head, SC, pp. 170-173 (1992).
Sperger et al., "High Performance Patterned All-Dielectric Interference Colour Filter for Display Applications", SID Digest, pp. 81-83, (1994).
Tai, C.Y. et al., "A Transparent Front Lighting System for Reflective-type Displays," 1995 SID International Symposium Digest of Technical Papers, Orlando, May 23-25, 1995, SID International Symposium Digest of Technical Papers, Santa Ana, SID, US vol. 26, May 23, 1995. pp. 375-378.
Walker, et al., "Electron-beam-tunable Interference Filter Spatial Light Modulator", Optics Letters vol. 13, No. 5, pp. 345-347, (May 1988).
IPRP for PCT Application No. PCT/US05/002986 filed Feb. 2, 2005.
"Glass Polarizing and Interference Filters," American Institute of Physics Handbook, pp. 6-172-6-178, 1982.
Austrian Search Report for U.S. Appl. No. 11/036,965 dated Jul. 25, 2005
Demiryont et al., "Innovative Transparent Elctrode for Flexible Displays," Defense, Security, Cockpit and Future Display II, Proc. Of SPIE vol. 6225, 622519, Apr. 2006.
Goossen, "MEMS-Based Variable Optical Interference Devices", IEEE/LEOS International Conference on Optical MEMS, pp. 17-18, Aug. 2000.
Hohlfeld et al., "Micro-Machined Tunable Optical Filters With Optimized Band-Pass Spectrum", 12th International Conference on Transducers, Solid-State Sensors, Actuators and Microsystems, vol. 2, pp. 1494-1497, (Jun. 8-12, 2003).
Lin et al., "Development of UV Stable LED Encapsulants," Microsystems, Packaging, Assembly and Circuits Technology Conference, 2009, IMPACT 2009, 4th International, Publication Year: 2009, pp. 565-567.
Neal T.D., et. al., "Surface Plasmon enhanced emission from dye doped polymer layers," Optics Express Opt. Soc. America, USA, vol. 13, No. 14, pp. 5522-5527, Jul. 11, 2005.
Obi et. al., Fabrication of Optical MEMS in SOL-GEL Materials; IEEE/LEOS International Conference on Optical MEMS, pp. 39-40, Aug. 2002.
Petschick, et.al., "Fabry-Perot-Interferometer," available at http://pl.physik.tu-berlin.de/groups/pg279/protokolless02/04_fpi.pdf, pp. 50-60, May 14, 2002.
Shane Dewitt, "Integrating Touch Screens and Optical Films: When, Where, and How?" 3M Touch Systems, Society for Information Display, Americas Display Engineering & Applications Conference, Oct. 24-27, 2005, Portland, Oregon U.S.A.
Office Action for U.S. Appl. No. 11/036,965, dated Mar. 28, 2006.
Amendment and Response in U.S. Appl. No. 11/036,965 dated Jun. 27, 2006.
Office Action for U.S. Appl. No. 11/036,965, dated Jan. 30, 2007.
Amendment and Response in U.S. Appl. No. 11/036,965 dated Jun. 29, 2007.
Notice of Allowance for U.S. Appl. No. 11/036,965, dated Sep. 11, 2007.
Office Action for U.S. Appl. No. 12/014,657, dated Aug. 21, 2008.
Amendment and Response in U.S. Appl. No. 12/014,657, dated Nov. 21, 2008.
Office Action for U.S. Appl. No. 12/014,657, dated Mar. 5, 2009.
Amendment and Response in U.S. Appl. No. 12/014,657, dated Jun. 5, 2009.
Office Action for U.S. Appl. No. 12/014,657, dated Oct. 15, 2009.
Amendment and Response in U.S. Appl. No. 12/014,657, dated Feb. 16, 2010.
Office Action for U.S. Appl. No. 12/014,657, dated May 28, 2010.
Official Communication in Chinese Patent Application No. 2005800003812.0 dated Mar. 7, 2008.
Official Communication in European Patent Application No. 05712433 dated Mar. 9, 2010.
Official Communication in Japanese Patent Application No. 2006552191, dated Sep. 8, 2009.
Official Communication in Japanese Patent Application No. 2006552191, dated Mar. 30, 2010.
Official Communication in Russian Patent Application No. 2006131568 Feb. 20, 2009.
Official Communication in ROC Patent Application No. 094103300 dated Mar. 26, 2010.
Official Communication in Vietnamese Patent Application No. 1-2006-01453, dated Dec. 16, 2009.
Office Action for U.S. Appl. No. 11/433,294, dated Mar. 17, 2008.
Response to Office Action in U.S. Appl. No. 11/433,294, dated Jul. 17, 2008.
Office Action in U.S. Appl. No. 11/433,294, dated Dec. 26, 2008.
Amendment and Response in U.S. Appl. No. 11/433,294, dated Mar. 26, 2009.

Notice of Allowance in U.S. Appl. No. 11/433,294, dated Apr. 9, 2009.
Request for Continued Examination and Information Disclosure Statement in U.S. Appl. No. 11/433,294, dated Jul. 8, 2009.
Notice of Allowance in U.S. Appl. No. 11/433,294, dated Sep. 21, 2009.
Request for Continued Examination, Amendment, and Information Disclosure Statement in U.S. Appl. No. 11/433,294, dated Dec. 21, 2009.
Interview Summary in U.S. Appl. No. 11/433,294, dated Feb. 8, 2010.
Notice of Allowance in U.S. Appl. No. 11/433,294, dated Feb. 23, 2010.
Request for Continued Examination and Information Disclosure Statement in U.S. Appl. No. 11/433,294, dated May 24, 2010.
Notice of Allowance in U.S. Appl. No. 11/433,294, dated Jun. 28, 2010.
Office Action for U.S. Appl. No. 10/249,243, dated Dec. 14, 2004.
Response to Office Action in U.S. Appl. No. 10/249,243, dated Mar. 14, 2005.
Office Action for U.S. Appl. No. 10/249,243, dated Jun. 15, 2005.
Response to Office Action in U.S. Appl. No. 10/249,243, dated Sep. 15, 2005.
Office Action for U.S. Appl. No. 10/249,243, dated Oct. 4, 2005.
Request for Continued Examination and Preliminary Amendment in U.S. Appl. No. 10/249,243, dated Oct. 13, 2005.
Office Action for U.S. Appl. No. 10/249,243, dated Dec. 27, 2005.
Response to Office Action in U.S. Appl. No. 10/249,243, dated Mar. 24, 2006.
Office Action for U.S. Appl. No. 10/249,243, dated Jun. 15, 2006.
Response to Office Action in U.S. Appl. No. 10/249,243, dated Aug. 15, 2006.
Notice of Allowance for U.S. Appl. No. 10/244,243, dated Sep. 18, 2006.
Request for Continued Examination and Information Disclosure Statement in U.S. Appl. No. 10/244,243, dated Dec. 18, 2007.
Notice of Allowance for U.S. Appl. No. 10/244,243, dated Feb. 12, 2007.
Interview Summary by Examiner for U.S. Appl. No. 10/244,243, dated May 11, 2007.
Request for Continued Examination and Information Disclosure Statement in U.S. Appl. No. 10/244,243, dated May 11, 2007.
Notice of Allowance for U.S. Appl. No. 10/244,243, dated Jun. 5, 2007.
Request for Continued Examination and Information Disclosure Statement in U.S. Appl. No. 10/244,243, dated Sep. 5, 2007.
Notice of Allowance for U.S. Appl. No. 10/244,243, dated Oct. 11, 2007.
Office Action for U.S. Appl. No. 12/024,815, dated Oct. 3, 2008.
Response to Office Action in U.S. Appl. No. 12/024,815, dated Feb. 3, 2009.
Office Action for U.S. Appl. No. 12/024,815, dated May 13, 2009.
Request for Continued Examination and Amendment in U.S. Appl. No. 12/024,815, dated Sep. 9, 2009.
Office Action in U.S. Appl. No. 12/024,815, dated Nov. 27, 2009.
Amendment in U.S. Appl. No. 12/024,815, dated Mar. 1, 2010.
Office Action in U.S. Appl. No. 12/024,815, dated May 27, 2010.
Notice of Allowance in U.S. Appl. No. 10/711,665, dated Aug. 25, 2005.
Amendment in U.S. Appl. No. 10/711,665, dated Jun. 7, 2005.
Office Action in U.S. Appl. No. 10/711,665, dated Mar. 8, 2005.
Office Action in Japanese Patent Application No. 2003-136788, dated Nov. 14, 2006.
Official Communication in ROC Patent Application No. 091137264, dated Nov. 3, 2006.
Office Action in U.S. Appl. No. 10/249,244, dated Sep. 29, 2004.
Amendment in U.S. Appl. No. 10/249,244, dated Nov. 15, 2004.
Notice of Allowance in U.S. Appl. No. 10/249,244, dated Jan. 26, 2005.
Office Action in U.S. Appl. No. 08/554,630, dated Aug. 1, 1996.
Response to Office Action in U.S. Appl. No. 08/554,630, dated Oct. 3, 1996.
Office Action in U.S. Appl. No. 08/554,630, dated Nov. 29, 1996.

Amendment in U.S. Appl. No. 08/554,630, dated May 29, 1997.
Advisory Action in U.S. Appl. No. 08/554,630, dated Jun. 10, 1997.
Office Action in U.S. Appl. No. 08/554,630, dated Mar. 31, 1998.
Response to Office Action in U.S. Appl. No. 08/554,630, dated Jun. 30, 1998.
Notice of Allowance in U.S. Appl. No. 08/554,630, dated Sep. 3, 1998.
Notice of Abandonment in U.S. Appl. No. 08/554,630, dated Feb. 5, 1999.
International Search Report in PCT/US96/17731, (International Publication No. WO 97/17628 A1) dated Jan. 28, 1997.
Akasaka, "Three-Dimensional IC Trends", Proceedings of IEEE, vol. 74, No. 12, Dec. 1986, pp. 1703-1714.
Aratani, K., et al., "Surface micromachined tuneable interferometer array", Sensors and Actuators, 1994, pp. 17-23.
Goossen et al., "Possible Display Applications of the Silicon Mechanical Anti-Reflection Switch", Society for Information Display, 1994.
Gosch, "West Germany Graps the Lead in X-Ray Lithography", Electronics, Feb. 5, 1987, pp. 78-80.
Howard, "Nanometer-Scale Fabrication Techniques", VLSI Electronics: Microstructure Science, vol. 5, 1982, pp. 145-153 & pp. 166-173.
Jackson, "Classical Electrodynamics", John Wiley & Sons Inc., 1962, pp. 568-573.
Johnson, "Optical Scanners", Microwave Scanning Antennas, vol. 1, p. 251-261, 1964.
Light Over Matters, Jun. 1993, Circle No. 36.
Newsbreaks, "Quantum-trench devices might operate at terahertz frequencies", Laser Focus World May 1993.
Oliner, "Radiating Elements and Mutual Coupling", Microwave scanning Antennas, vol. 2, pp. 131-194, 1966.
Stone, "Radiation and Optics, An Introduction to the Classical Theory", McGraw-Hill, pp. 340-343, 1963.
Winton, John M., "A novel way to capture solar energy", Chemical Week, May 15, 1985, pp. 17-18.
Wu, "Design of a Reflective Color LCD Using Optical Interference Reflectors", ASIA Display '95, Oct. 16, pp. 929-931.
Imenes et al., "Spectral beam splitting technology for increased conversion efficiency in solar concentrating systems: a review" Solar Energy Materials, Elsevier Science Publishers B.V. Amsterdam, NL, vol. 84, Oct. 1, 2004, pp. 19-69, XP002474546.
Nakagawa et al., "Wide-Field -of-View Narrow-Band Spectral Filters Based on Photonic Crystal Nanocavities", Optical Society of America, Optics Letters, vol. 27, No. 3, pp. 191-193, 2002.
Official Communication in Chinese App. No. 201010140527.6, dated Oct. 12, 2010.
Request for Continued Examination and Amendment in U.S. Appl. No. 12/014,657, dated Aug. 30, 2010.
Office Action in Japanese Application No. 2006-552191, dated Oct. 22, 2010.
Official Communication in Mexican Application No. PA/a/2006/008719 dated Aug. 12, 2008.
Official Communication in Taiwanese Application No. 094103300, dated Aug. 16, 2006.
Request for Continued Examination and Information Disclosure Statement in U.S. Appl. No. 11/433,294, dated Sep. 27, 2010.
Notice of Allowance in U.S. Appl. No. 11/433,294, dated Oct. 18, 2010.
Amendment in U.S. Appl. No. 12/024,815, dated Aug. 27, 2010.
Official Communication in Japanese App. No. 2003-136787 mailed Nov. 14, 2006.
Office Action in Japanese Application No. 2006-552191, dated Oct. 19, 2010.
Official Communication in Canadian Application No. 2554980, dated Feb. 8, 2011.
"ABS 407: Visible Narrow Band Absorber," downloaded from http://www.exciton.com/pdfs/ABS407.pdf on Feb. 8, 2011.
Chemical Properties Handbook, McGraw-Hill, 1999, Refractive Index, Dipole Moment and Radius of Gyration; Inorganic Compounds, No. 151: O2Si.
Preliminary Amendment in U.S. Appl. No. 11/433,294, dated Jun. 3, 2010.

Issue Fee, Amendment After Allowance Under 37 C.F.R. §1.312, and Information Disclosure Statement in U.S. Appl. No. 11/433,294, dated Jan. 14, 2011.
Response to Rule 312 Communication in U.S. Appl. No. 11/433,294, dated Jan. 26, 2011.
Office Action in U.S. Appl. No. 12/024,815, dated Nov. 15, 2010.
Examiner Interview Summary in U.S. Appl. No. 12/024,815, dated Dec. 20, 2010.
Amendment in U.S. Appl. No. 12/024,815, dated Jan. 10, 2011.
Office Action in U.S. Appl. No. 12/024,815, dated Feb. 2, 2011.
Lau "Infrared characterization for microelectronics" New Jersey: World Scientific, Oct. 1999, pp. 55-71, ISBN 981-02-2352-8.
Official Communication in Chinese Application No. 03103516.7, dated Mar. 11, 2005.
Office Action in Japanese Patent Application No. 2003-136788, dated Oct. 25, 2005.
Office Action in Korean Patent Application No. 10-2003-0026833, dated Apr. 30, 2005.
Official Communication in ROC Patent Application No. 091137264, dated Jul. 4, 2005.
Official Communication in Chinese Application No. 03100366.4, dated Apr. 8, 2005.
Official Communication in Japanese Application No. 2003-136787, dated Oct. 25, 2005.
Official Communication in Taiwanese Application No. 091137638, dated Mar. 11, 2004.
Notice of Allowance in U.S. Appl. No. 10/812,257, dated Dec. 21, 2004.
Office Action in Chinese Patent Application No. 2004-100285290, dated Oct. 21, 2005.
Office Action in Chinese Patent Application No. 2004-100285290, dated Jul. 14, 2006.
Office Action in Chinese Patent Application No. 2004-100285290, dated Nov. 3, 2006.
Office Action in Japanese Patent Application No. 2004-104188, dated Nov. 21, 2006.
Office Action in Japanese Patent Application No. 2004-104188, dated Mar. 20, 2007.
Office Action in Japanese Patent Application No. 2004-104188, dated Aug. 28, 2007.
Office Action in Korean Patent Application No. 10-2004-0025016, dated Mar. 21, 2006.
Official Communication in Korean Patent Application No. 10-2006-7015589, dated Jun. 3, 2011.
Official Communication in Korean Patent Application No. 10-2006-7002289, dated Jun. 3, 2011.

* cited by examiner

SPATIAL LIGHT MODULATOR WITH INTEGRATED OPTICAL COMPENSATION STRUCTURE

CROSS-REFERENCE TO RELATED APPLICATIONS

This application is a continuation of U.S. patent application Ser. No. 11/036,965, filed Jan. 14, 2005, which claims priority benefit under 35 U.S.C. §119(e) to: U.S. Provisional Patent Application Ser. No. 60/541,607, filed Feb. 3, 2004; U.S. Provisional Patent Application Ser. No. 60/613,482, filed Sep. 27, 2004; U.S. Provisional Patent Application Ser. No. 60/613,536, filed Sep. 27, 2004; and U.S. Provisional Patent Application Ser. No. 60/613,542, filed Sep. 27, 2004; all of which are hereby incorporated by reference in their entireties.

BACKGROUND

1. Field of the Invention

This invention relates to improvements in the manufacturing and performance of spatial light modulators such as interferometric modulators.

2. Description of the Related Art

Spatial light modulators are display devices that contain arrays of individually addressable light modulating elements. Examples of spatial light modulators include liquid crystal displays and interferometric modulator arrays. The light modulating elements in such devices typically function by altering the characteristics of light reflected or transmitted through the individual elements, thus altering the appearance of the display.

SUMMARY

As spatial light modulators become increasingly sophisticated, the inventor anticipates that difficulties associated with fabricating them by current manufacturing process flows will also increase. Accordingly, the inventor has developed spatial light modulators having integrated optical compensation structures and methods for making them.

An embodiment provides a spatial light modulator that includes a substrate; a plurality of individually addressable light-modulating elements arranged over the substrate and configured to modulate light transmitted through the substrate; and an optical compensation structure; wherein the optical compensation structure is arranged between the substrate and the plurality of individually addressable light-modulating elements. In certain embodiments, the optical compensation structure is a passive optical compensation structure.

An embodiment provides a spatial light modulator that includes a substrate; a plurality of individually addressable light-modulating elements arranged over the substrate and configured to modulate light transmitted through the substrate; and an optical compensation structure; wherein the plurality of individually addressable light-modulating elements is arranged between the substrate and the optical compensation structure. In certain embodiments, the optical compensation structure is a passive optical compensation structure.

Another embodiment provides a method of making a spatial light modulator that includes fabricating an optical compensation structure over a transparent substrate; and fabricating a plurality of individually addressable light-modulating elements over the optical compensation structure, the individually addressable light-modulating elements being configured to modulate light transmitted through the transparent substrate. In certain embodiments, fabricating the optical compensation structure includes fabricating a passive optical compensation structure.

Another embodiment provides a method of making a spatial light modulator that includes fabricating a plurality of individually addressable light-modulating elements over a substrate; and fabricating an optical compensation structure over the plurality of individually addressable light-modulating elements, the individually addressable light-modulating elements being configured to modulate light transmitted through the optical compensation structure. In certain embodiments, fabricating the optical compensation structure includes fabricating a passive optical compensation structure.

Another embodiment provides a spatial light modulator that includes a transparent substrate; a plurality of individually addressable interferometric light-modulating elements arranged over the transparent substrate and configured to modulate light transmitted through the transparent substrate, the interferometric light-modulating elements comprising a cavity and a movable wall; and at least one optical compensation structure arranged between the transparent substrate and the plurality of individually addressable interferometric light-modulating elements, the optical compensation structure comprising a black mask, color filter, or diffuser.

Another embodiment provides a spatial light modulator that includes a substrate; a plurality of individually addressable interferometric light-modulating elements arranged over the substrate and configured to modulate light transmitted through or reflected from the substrate, the interferometric light-modulating elements comprising a cavity and a movable wall; and at least one optical compensation structure, the plurality of individually addressable interferometric light-modulating elements being arranged between the substrate and the optical compensation structure, the optical compensation structure comprising a structure selected from the group consisting of an anti-reflective layer, a diffractive optical element, a structure that scatters light, a black mask, a color filter, a diffuser, a microlens array, and a holographic film.

Another embodiment provides a spatial light modulator that includes a substrate; a means for modulating light transmitted through or reflected from the substrate; and a means for compensating the light transmitted through or reflected from the substrate; wherein the means for compensating the light is operatively arranged between the substrate and the means for modulating light transmitted through or reflected from the substrate. In certain embodiments, the means for compensating the light transmitted through or reflected from the substrate is a means for passively compensating the light transmitted through or reflected from the substrate.

Another embodiment provides a spatial light modulator that includes a substrate; a means for modulating light transmitted through or reflected from the substrate; and a means for compensating the light transmitted through or reflected from the substrate;

wherein the means for modulating light transmitted through or reflected from the substrate is operatively arranged between the substrate and the means for compensating the light. In certain embodiments, the means for compensating the light transmitted through or reflected from the substrate is a means for passively compensating the light transmitted through or reflected from the substrate.

Another embodiment provides a spatial light modulator made by a method that includes fabricating an optical compensation structure over a transparent substrate; and fabricating a plurality of individually addressable light-modulating elements over the optical compensation structure, the individually addressable light-modulating elements being configured to modulate light transmitted through the transparent substrate.

Another embodiment provides a spatial light modulator made by a method that includes fabricating a plurality of individually addressable light-modulating elements over a substrate; and fabricating an optical compensation structure over the plurality of individually addressable light-modulating elements, the individually addressable light-modulating elements being configured to modulate light transmitted through the optical compensation structure.

These and other embodiments are described in greater detail below.

BRIEF DESCRIPTION OF THE DRAWINGS

These and other aspects of the invention will be readily apparent from the following description and from the appended drawings, which are meant to illustrate and not to limit the invention, and wherein.

DETAILED DESCRIPTION OF PREFERRED EMBODIMENTS

A preferred embodiment is an interferometric modulator that includes at least one integrated optical compensation structure. In some configurations, the optical compensation structure is arranged between the substrate and the light-modulating elements of the interferometric modulator. In other configurations, the light-modulating elements are arranged between the substrate and the optical compensation structure.

Figure 1A:
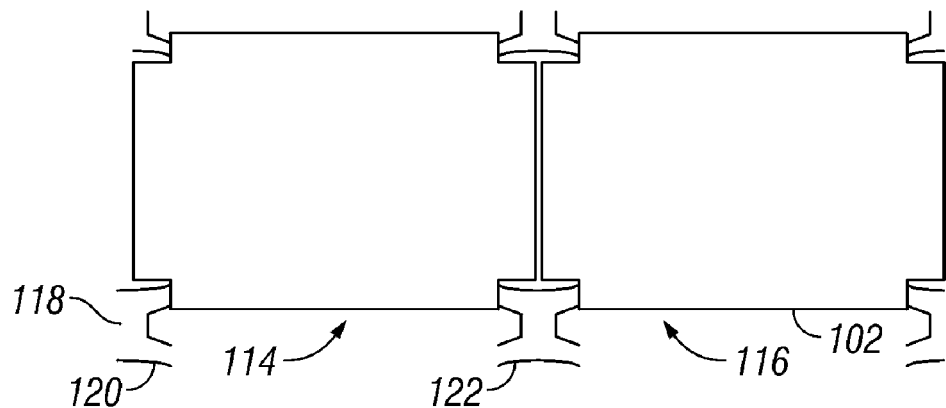
FIGS. 1A and 1B illustrate some characteristics of a typical interferometric modulator (see FIGS. 1A and 1B of U.S. Patent Publication No. 2002/0126364 A1).
Figure 1B:
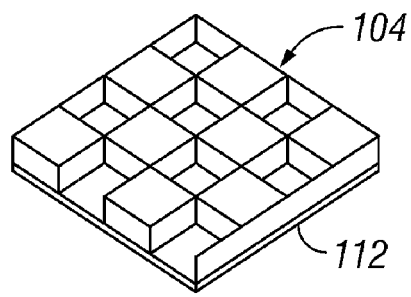
Figure 2:
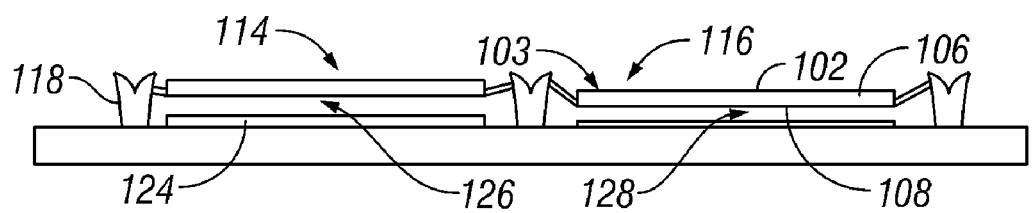
FIG. 2 illustrates some characteristics of a typical interferometric modulator (see FIG. 2 of U.S. Patent Publication No. 2002/0126364 A1).

Various examples of interferometric modulators are described in U.S. Patent Publication No. 2002/0126364 A1. FIGS. 1 and 2 illustrate some characteristics of a typical interferometric modulator (see FIGS. 1 and 2 of U.S. Patent Publication No. 2002/0126364 A1 and the corresponding text). Referring to FIGS. 1A and 1B, two interferometric modulator structures 114 and 116 each include a secondary mirror 102 with a corrugated pattern 104 etched into its upper (outer) surface 103, using any of a variety of known techniques. The corrugation does not extend through the membrane 106 on which the mirror is formed so that the inner surface 108 of the mirror remains smooth. FIG. 1B reveals the pattern of etched corrugation 104 on the secondary mirror and the smooth inner surface 112 which remains after etch. The corrugated pattern, which can be formed in a variety of geometries (e.g., rectangular, pyramidal, conical), provides structural stiffening of the mirror, making it more immune to variations in material stresses, reducing total mass, and preventing deformation when the mirror is actuated.

In general, an interferometric modulator which has either no voltage applied or some relatively steady state voltage, or bias voltage, applied is considered to be in a quiescent state and will reflect a particular color, a quiescent color. As referenced in U.S. Patent Publication No. 2002/0126364 A1, the quiescent color is determined by the thickness of the sacrificial spacer upon which the secondary mirror is fabricated.

Each interferometric modulator 114, 116 is rectangular and connected at its four corners to four posts 118 via support arms such as 120 and 122. In some cases (see discussion in U.S. Patent Publication No. 2002/0126364 A1), the interferometric modulator array will be operated at a selected constant bias voltage. In those cases, the secondary mirror 102 will generally maintain a quiescent position which is closer to corresponding primary mirror 128 than without any bias voltage applied. The fabrication of interferometric modulators with differently sized support arms allows for the mechanical restoration force of each interferometric modulator to be determined by its geometry. Thus, with the same bias voltage applied to multiple interferometric modulators, each interferometric modulator may maintain a different biased position (distance from the primary mirror) via control of the dimensions of the support arm and its resulting spring constant. The thicker the support arm is, the greater its spring constant. Thus different colors (e.g., red, green, and blue) can be displayed by different interferometric modulators without requiring deposition of different thickness spacers. Instead, a single spacer, deposited and subsequently removed during fabrication, may be used while color is determined by modifying the support arm dimensions during the single photolithographic step used to define the arms. For example, in FIG. 2, interferometric modulators 114, 116 are both shown in quiescent states with the same bias voltage applied. However, the gap spacing 126 for interferometric modulator 114 is larger than gap spacing 128 for interferometric modulator 116 by virtue of the larger dimensions of its respective support arms. Various other examples of interferometric modulators are also known.

U.S. Patent Publication No. 2002/0126364 A1 also describes various passive optical compensation structures for minimizing color shift as the angle of incidence changes (a characteristic typical of interferometric structures) and active optical compensation structures for supplying supplemental illumination. For example, as illustrated in FIGS. 3A-3F (see FIGS. 6A-6F of U.S. Patent Publication No. 2002/0126364 A1), an optical compensation film may be fabricated on the opposite surface of the substrate from which the array of light modulating elements resides. Such films can be designed and fabricated in a number of ways, and may be used in conjunction with each other.

Figure 3A:
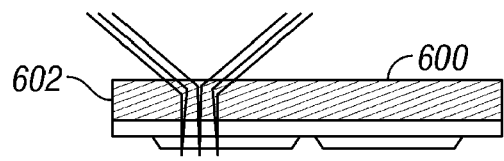
FIGS. 3A-3F illustrate optical compensation films fabricated on the opposite surface of the substrate from which an array of light modulating elements resides (see FIG. 6A-6F of U.S. Patent Publication No. 2002/0126364 A1).

In FIG. 3A, a passive optical compensation film 600 is a volume or surface relief holographic film. A volume holographic film may be produced by exposing a photosensitive polymer to the interference pattern produced by the intersection of two or more coherent light sources (e.g., lasers). Using the appropriate frequencies and beam orientations arbitrary periodic patterns of refractive indices within the film may be produced. A surface relief holographic film may be produced by creating a metal master using any number of microfabrication techniques known by those skilled in the art. The master is subsequently used to pattern the film. Such films can be used to enhance the transmission and reflection of light within a definable cone of angles, thus minimizing off-axis light. The colors and brightness of a display viewed with on axis light are enhanced and color shift is diminished because brightness goes down significantly outside of the cone.

Figure 3B:
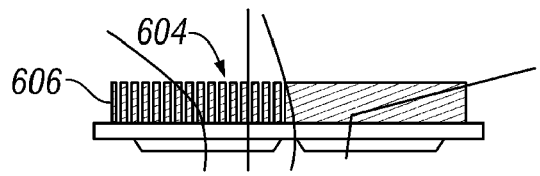

In FIG. 3B, another approach is illustrated for a device 604 in which an array of passive optical compensation structures 606 is fabricated on the substrate. These structures, which can be fabricated using the techniques referenced in U.S. Patent Publication No. 2002/0126364 A1, can be considered photonic crystals, as described in the book "Photonic Crystals", by John D. Joannopoulos, et al. They are essentially three-dimensional interferometric arrays which demonstrate interference from all angles. This provides the ability to design waveguides which can perform a number of functions including channeling incident light of certain frequencies to the appropriately colored pixels, or by changing light of a certain incidence angle to a new incidence angle, or some combination of both.

Figure 3C:
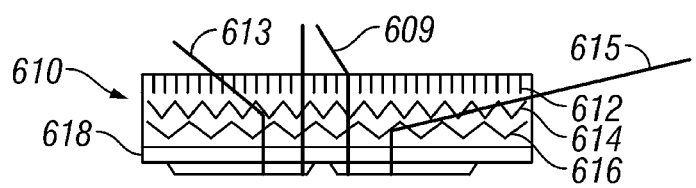

In another example of a passive optical compensation structure, seen in FIG. 3C, a three-layer polymeric film 610 contains suspended particles. The particles are actually single or multi-layer dielectric mirrors which have been fabricated in the form of microscopic plates. These plates, for example, may be fabricated by deposition of multilayer dielectric films onto a polymer sheet which, when dissolved, leaves a film which can "ground up" in a way which produces the plates. The plates are subsequently mixed into a liquid plastic precursor. By the application of electric fields during the curing process, the orientation of these plates may be fixed during manufacture. The mirrors can be designed so that they only reflect at a range of grazing angles. Consequently, light is either reflected or transmitted depending on the incidence angle with respect to the mirror. In FIG. 3C, layer 612 is oriented to reflect light 609 of high incidence that enters the film 610 closer to the perpendicular. Layer 614 reflects light 613 of lower incidence into a more perpendicular path. Layer 616 modifies the even lower angle incident light 615. Because the layers minimally affect light which approaches perpendicularly, they each act as a separate "angle selective incidence filter" with the result that randomly oriented incident light couples into the substrate with a higher degree of perpendicularly. This minimizes the color shift of a display viewed through this film.

Figure 3D:

In another example of a passive optical compensation structure, illustrated in FIG. 3D, micro lenses 622 are used in an array in device 620. Each lens 622 may be used to enhance the fill factor of the display by effectively magnifying the active area of each pixel. This approach may be used by itself or in conjunction with the other color shift compensation films.

Figure 3E:
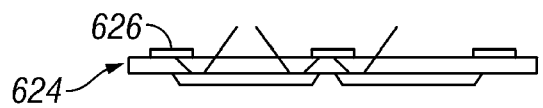
Figure 3F:
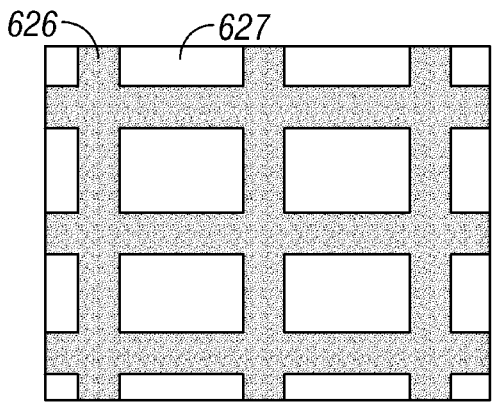

In an example of an active optical compensation structure, illustrated in FIG. 3E, device 624 uses supplemental lighting in the form of a frontlighting array. In this case an organic light emitting material 626, for example, Alq/diamine structures and poly(phenylene vinylene), can be deposited and patterned on the substrate. The top view, FIG. 3F, reveals a pattern 627 which corresponds with the interferometric modulator array underneath. That is, the light emitting areas 626 are designed to obscure the inactive areas between the interferometric modulator, and allow a clear aperture in the remaining regions. Light is actively emitted into the substrate onto the interferometric modulator and is subsequently reflected back to the viewer. Conversely, a patterned emitting film may be applied to the backplate of the display and light transmitted forward through the gaps between the sub-pixels. By patterning a mirror on the front of the display, this light can be reflected back upon the interferometric modulator array. Peripherally mounted light sources in conjunction with films relying on total internal reflection are yet another approach. U.S. Pat. No. 6,055,090 also discloses an interferometric modulator having an active optical compensation structure that includes a supplemental frontlighting source.

Figure 4:
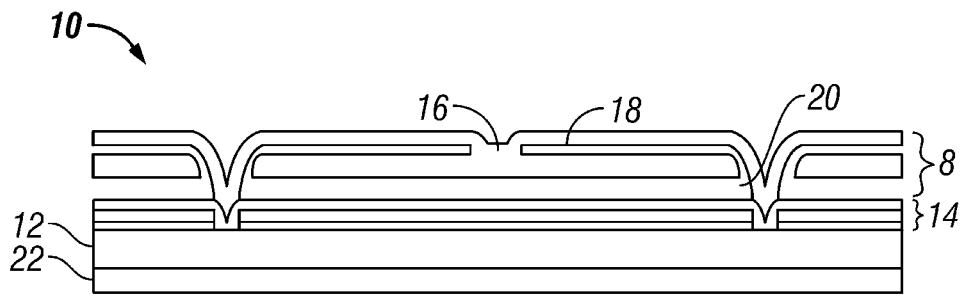
FIG. 4 illustrates an optical compensation film (diffuser) fabricated on the opposite surface of the substrate from which a light modulating element resides.

FIG. 4 illustrates an interferometric modulator 10 comprising a passive optical compensation film (a diffuser 22) fabricated on the opposite surface of the substrate from which a light modulating element resides. The diffuser 22 generally compensates for the specular appearance of an uncompensated spatial light modulator array, e.g., by making the reflective array appear less like a mirror and more like paper. In FIG. 4, a light modulating element 8 comprises a movable wall or element 16, a cavity 20, and a support post 18. As illustrated in FIG. 4, the movable wall 16 is supported over the cavity 20 by the support post 18. An optical stack 14 forms a wall of the cavity 20 opposite to the movable wall 16. The optical stack 14 may be considered part of the light modulating element 8. The optical stack 14 is fabricated on a transparent substrate 12, and the diffuser 22 is fabricated on the opposite side of the substrate 12 from the light modulating element 8. In operation, the movable wall 16 moves through planes parallel to the front wall of the cavity 20. The movable wall 16 is highly reflective and typically comprises a metal. As the movable wall 16 moves toward the optical stack 14 on the opposite side of the cavity 12, self-interference of light (typically entering through the transparent substrate 12 and the optical stack 14) within the cavity 20 occurs. The color of the reflected light that exits the cavity through the transparent substrate 12 and the optical stack 14 may be controlled by varying the distance between the optical stack 14 and the movable wall 16. The surface of the transparent substrate 12 in contact with the optical stack 14 is the surface upon which the light modulating element 8 is fabricated. The diffuser 22 is typically fabricated or attached to the opposite surface of the transparent substrate 12 after fabrication of the light modulating element 8.

As illustrated in FIG. 4 and by the disclosure of U.S. Patent Publication No. 2002/0126364 A1, passive optical compensation structures for spatial light modulators are typically fabricated on the opposite surface of the substrate from which the array of light modulating elements resides to facilitate existing manufacturing process flows.

Manufacturing of the overall display system typically involves producing the various components separately, such as the passive optical compensation structures, the interferometric modulator structures, the driver electronics, the graphics control functions, etc., and then integrating them at a later stage in the manufacturing process flow. Producing the various components separately and then integrating them at a later stage simplifies the delicate task of manufacturing the light modulating elements by reducing the need for complex deposition and micro-fabrication schemes.

As spatial light modulators become increasingly sophisticated, it is anticipated that difficulties associated with fabricating them by current manufacturing process flows will also increase. Accordingly, spatial light modulators having integrated optical compensation structures and methods for making them have been developed. An embodiment provides spatial light modulators having an integrated optical compensation structure, e.g., an optical compensation structure located between the substrate and the light-modulating elements, or an optical compensation structure located on the opposite side of the light-modulating elements from the substrate. The optical compensation structure may be active or passive, as desired. In this context, a "passive" optical compensation structure is one that does not supply a supplemental frontlighting source.

As discussed above, FIG. 4 illustrates a passive optical compensation film (a diffuser 22) fabricated on the opposite surface of the substrate from which a light modulating element resides. In FIG. 4, the light modulating element 8 is an interferometric modulator comprising the movable wall or element 16, the cavity 12, the support post 18. The optical stack 14 is fabricated on the transparent substrate 12, and the diffuser 22 is fabricated on the opposite side of the substrate 12 from the light modulating element 8. The optical stack 14 may be considered part of the light modulating element 8. Those skilled in the art appreciate that, in some embodiments, an interferometric modulator may modulate between a black, or absorbing state, and a reflecting state. The reflecting state is a non-interference based state that appears to be white. While the white state in these embodiments does not particularly depend on the interference characteristics of the modulator, the modulating elements preferably have a structure that is similar to those embodiments of interferometric modulators that rely upon the interference characteristics and will be referred to as such herein. Interferometric modulators may modulate between an absorbing state and an interference state, between an absorbing state and a reflective state, between a reflective state and an interference state, or between two different interference states.

Figure 5A:
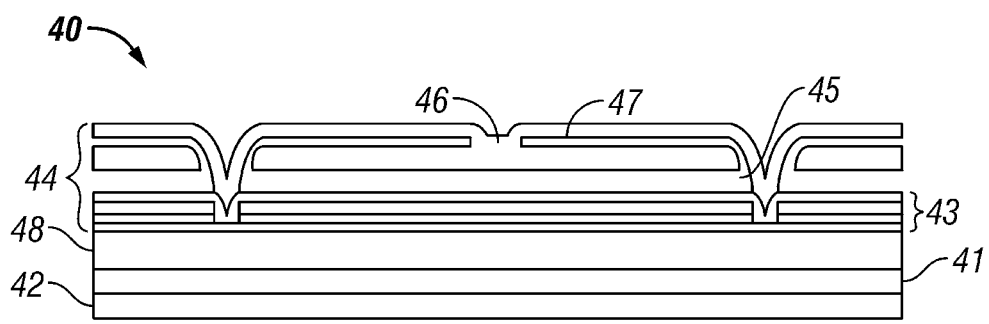
FIGS. 5A to 5C illustrate various embodiments of spatial light modulators comprising integrated optical compensation structures.

FIG. 5A illustrates an embodiment of a spatial light modulator 40 in which a passive optical compensation structure (diffuser 41) is arranged between a substrate 42 and a light-modulating element 44, rather than being on the opposite side of the substrate from the light modulating element as shown in FIG. 4. In the embodiment illustrated in FIG. 5A, the light-modulating element 44 is an interferometric modulator comprising a cavity 45, a movable wall 46, an optical stack 43, and a support 47. The optical stack 43 is on the wall of the cavity 45 that is opposite to the movable wall 46. In the illustrated embodiment, the spatial light modulator 40 further comprises a planarization layer 48 between the substrate 42 and the optical stack 43. Both the movable wall 46 and the optical stack 43 are reflective, so that operation of spatial light modulator 40 is generally similar to that described for the spatial light modulator 10 illustrated in FIG. 4. Typically, the substrate 42 is at least partially transparent. Those skilled in the art will appreciate that the light-modulating element 44 may be configured in an array comprising a plurality of individually addressable light-modulating elements arranged over a transparent substrate and configured to modulate light transmitted through the transparent substrate.

Those skilled in the art will also appreciate that the diffuser 41 illustrated in FIG. 5A is representative of various optical compensation structures (both active and passive) that may be arranged between the substrate and the plurality of individually addressable light-modulating elements. For example, an active optical compensation structure may supply a supplemental frontlighting source. Non-limiting examples of passive optical compensation structures include an anti-reflective layer, a diffractive optical element, a structure that scatters light, a black mask, a color filter, a microlens array, a holographic film (e.g., that mitigates a shift in reflected color with respect to an angle of incidence of the light transmitted through the transparent substrate), or a combination thereof. In FIG. 5, the light-modulating element 44 comprises an interferometric modulator, but other spatial light modulators may also be used.

Figure 5B:
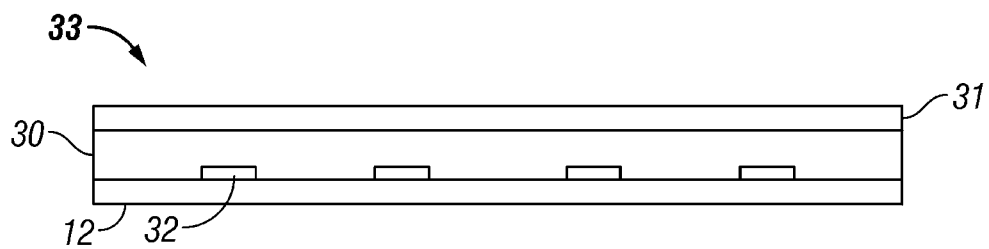

FIG. 5B illustrates an embodiment of a spatial light modulator 33 in which a passive optical compensation structure (black mask 32) is arranged between a transparent substrate 12 and a reflecting element 31. The reflecting element may be an optical stack. Black masks such as the black mask 32 may be used to mask parts of the spatial light modulator structure that are not desirable for the viewer to see. A light modulating element or elements (e.g., a plurality of individually addressable light-modulating elements) are omitted from FIG. 5B for clarity, but are understood to be arranged over the transparent substrate 12 and configured to modulate light transmitted through the transparent substrate 12. For example, the light modulating element of FIG. 5B may comprise a plurality of individually addressable light-modulating elements arranged over the reflecting element 31 as discussed above with respect to FIG. 5A. The spatial light modulator 33 may include a planarization layer 30, e.g., between the black mask 32 and the reflecting element 31 as shown in FIG. 5B.

Figure 5C:
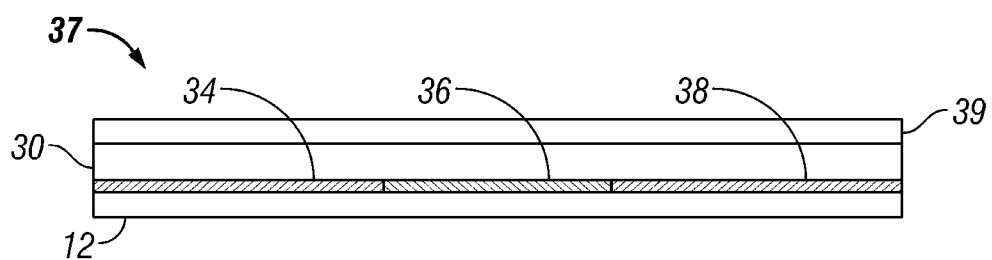

FIG. 5C illustrates an embodiment of a spatial light modulator 37 in which a passive optical compensation structure (comprising color filter elements 34, 36, 38) is arranged between a transparent substrate 12 and a reflecting element 39. As in FIG. 5B, the reflecting element 39 may be an optical stack. In the illustrated embodiment, the color filter elements 34, 36, 38 are red, green and blue, respectively, but other colors may be selected by those skilled in the art so that the resulting spatial light modulator produces the desired colors. As in FIG. 5B, a light modulating element or elements (e.g., a plurality of individually addressable light-modulating elements) are omitted from FIG. 5C for clarity, but are understood to be arranged over the transparent substrate 12 and configured to modulate light transmitted through the transparent substrate 12. For example, the light modulating element of FIG. 5C may comprise a plurality of individually addressable light-modulating elements arranged over the optical stack as discussed above with respect to FIG. 5A. The spatial light modulator 37 may include a planarization layer 30, e.g., between the color filter elements 34, 36, 38 and the optical stack 39 as shown in FIG. 5C.

The use of a color filter may increase the performance of the spatial light modulator by enhancing color saturation. Also, interferometric modulators that produce only black and white may be used in combination with color filters to produce colored light.

Interferometric modulators may be fabricated to produce various colors by varying the size of the cavity. However, varying the size of the cavity may involve varying the manufacturing process, e.g., by manufacturing a different size cavity for an interferometric modulator that produces green light than for an interferometric modulator that produces red light. The use of black and white interferometric modulators in combination with color filters may substantially simplify the manufacturing process. Other improvements in the manufacturing process are realized by integrating the color filter into the interferometric modulator as illustrated in FIG. 5C.

Figure 6:
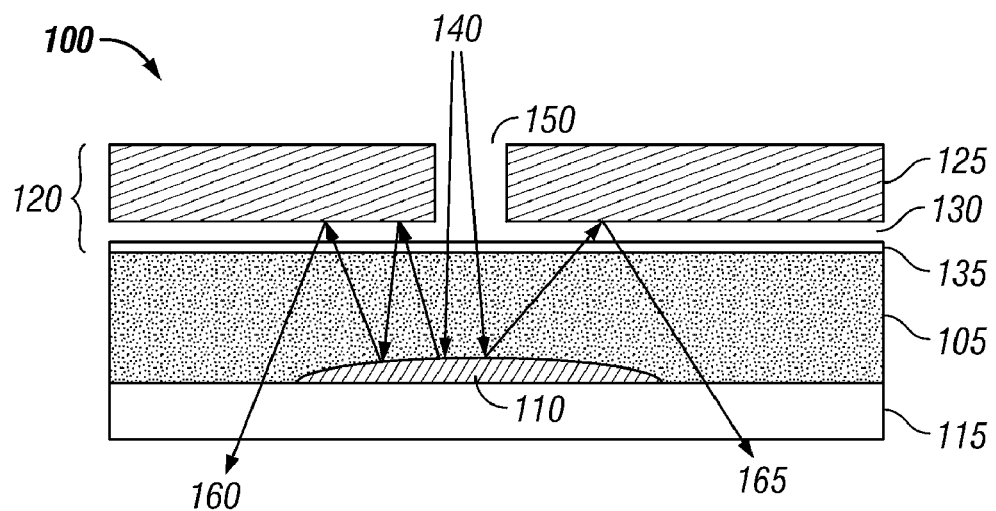
FIG. 6 illustrates an embodiment of a spatial light modulator comprising an integrated optical compensation structure that scatters light.

FIG. 6 illustrates an embodiment of a spatial light modulator 100 in which a passive optical compensation structure 105 (a planarization layer comprising a scattering element 110) is arranged between a transparent substrate 115 and a light-modulating element 120. In the embodiment illustrated in FIG. 6, the light-modulating element 120 is an interferometric modulator comprising a cavity 130, a movable wall 125, and an optical stack 135. The optical stack 135 is on the wall of the cavity 130 that is opposite to the movable wall 125. Both the movable wall 125 and the optical stack 135 are reflective (the optical stack 135 is partially reflective), so that operation of spatial light modulator 100 is generally similar to that described for the spatial light modulator 10 illustrated in FIG. 4. Light 140 passes through a slot 150 in the movable wall 125 and reflects from the scattering element 110 such that it scatters the light 140 back to the movable wall 125 (and in some cases back again to the scattering element 110), ultimately passing through the transparent substrate 115 and exiting 160, 165 as shown in FIG. 6. Preferably, the scattering element 110 is shaped such that the light 140 is scattered randomly. For clarity, a single scattering element 110 and a single slot 150 are illustrated in FIG. 6, but it will be understood that the spatial light modulator 100 may comprise a plurality of scattering elements and slots, arranged to provide the desired amount of scattered light.

Figure 7A:
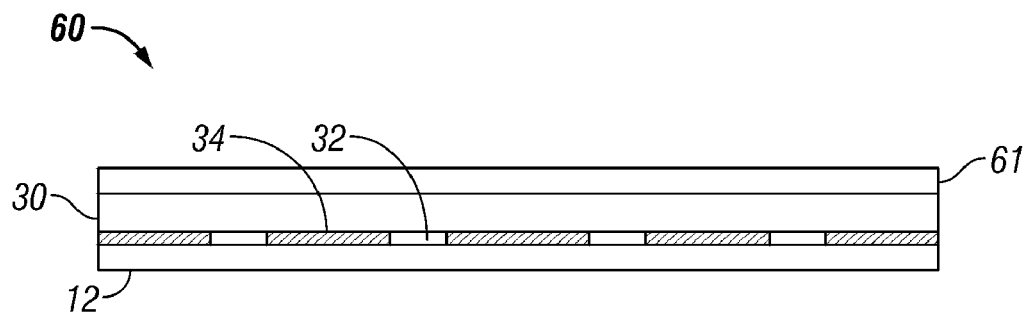
FIGS. 7A and 7B illustrate various embodiments of spatial light modulators comprising integrated optical compensation structures.
Figure 7B:
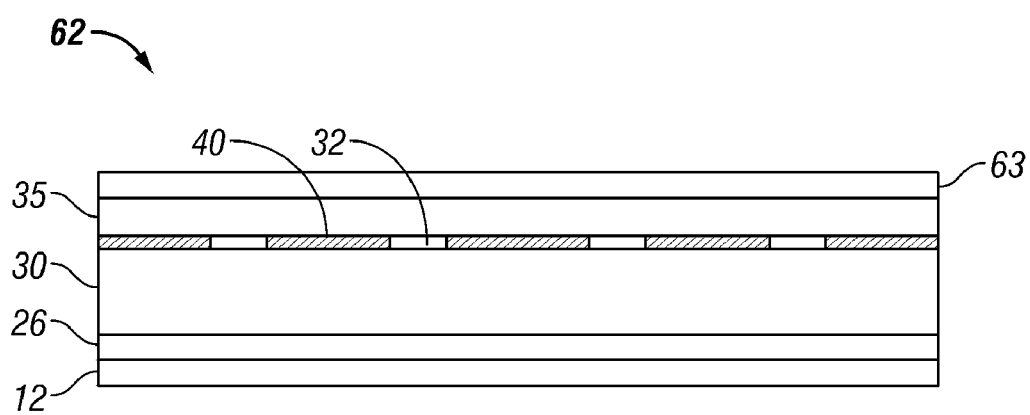

FIGS. 7A and 7B illustrate embodiments of spatial light modulators comprising different combinations of integrated optical compensation structures. FIG. 7A illustrates an embodiment of a spatial light modulator 60 in which a passive optical compensation structure (comprising a color filter element 34 and a black mask 32) is arranged between a transparent substrate 12 and an optical stack 61. FIG. 7B illustrates an embodiment of a spatial light modulator 62 in which a first passive optical compensation structure (comprising a color filter element 40 and a black mask 32) and a second passive optical compensation structure (comprising diffuser 26) are arranged between a transparent substrate 12 and an optical stack 63. As in FIGS. 5B and 5C, a light modulating element or elements (e.g., a plurality of individually addressable light-modulating elements) are omitted from FIGS. 7A and 7B for clarity, but are understood to be arranged over the transparent substrate 12 and configured to modulate light transmitted through the transparent substrate. The spatial light modulators 60, 62 may include a planarization layer 30 e.g., between the passive optical compensation structure (comprising the color filter element 34 and the black mask 32) and the optical stack 61 as shown in FIG. 7A, or between the first and second passive optical compensation structures as shown in FIG. 7B. The spatial light modulator may include an additional planarization layer, e.g., a planarization layer 35 as shown in FIG. 7B between the first passive optical compensation structure (comprising a color filter element 40 and a black mask 32) and the optical stack 63.

Spatial light modulators may comprise an optical compensation structure that performs one or more functions (e.g., a color filter and a black mask as illustrated in FIG. 7A), and/or the optical compensation structure may comprise multiple layers, optionally separated from each other by planarization layers (e.g., as illustrated in FIG. 7B). Those skilled in the art will understand that the term "optical compensation structure" may be used to refer to a structure having a particular function (e.g., the diffuser 26), a layer having multiple functions (e.g., comprising the color filter element 34 and the black mask 32), or multiple layers each having one or more functions as illustrated in FIG. 7B, optionally including planarization layer(s). Thus, spatial light modulators may comprise any combination of active and/or passive optical compensation structures, e.g., a black mask and a color filter; a black mask and a diffuser; a color filter and a diffuser; a black mask, color filter and a diffuser, etc. Means for compensating the light transmitted through the transparent substrate include optical compensation structures as described herein.

Figure 8:
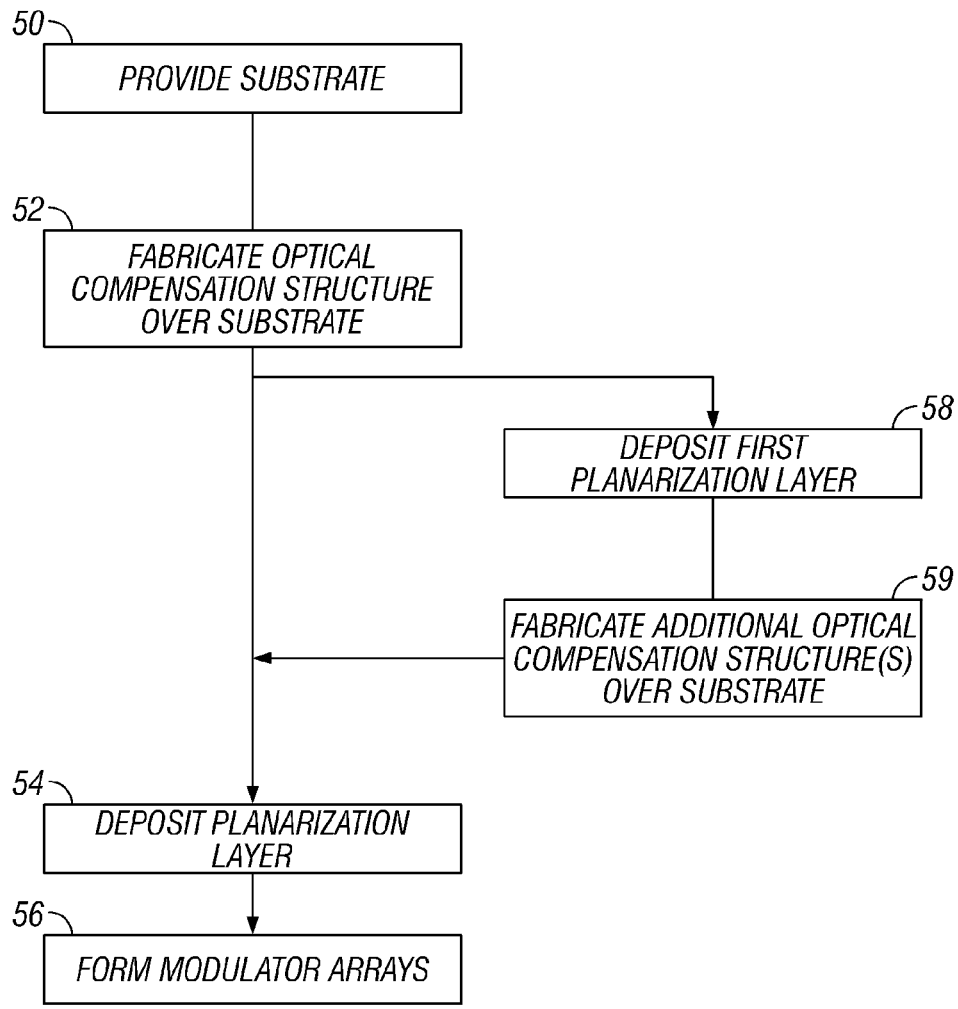
FIG. 8 illustrates an embodiment of a manufacturing process flow diagram for making spatial light modulators comprising integrated optical compensation structures.

Spatial light modulators comprising an optical compensation structure may be fabricated by integrating the fabrication of the optical compensation structure into the process for fabricating the spatial light modulator. An example of such a process is illustrated in FIG. 8. The process begins with the substrate being provided at step 50. Typically, the substrate is glass, plastic or other transparent substrate. Those skilled in the art will appreciate that the term "transparent" as used herein encompasses materials that are substantially transparent to the operational wavelength(s) of the spatial light modulator, and thus transparent substrates need not transmit all wavelengths of light and may absorb a portion of the light at the operational wavelength(s) of the spatial light modulator. For example, the transparent substrate may be tinted and/or polarized if desired for a particular application. Thus, the transparency and reflectivity of the substrate may be varied, depending on the configuration and the function desired. In some embodiments, the substrate is at least partially transparent and may be substantially transparent. In other embodiments, the substrate is at least partially reflective and may be substantially reflective. It is understood that a substrate may be both partially transparent and partially reflective.

The process illustrated in FIG. 8 continues at step 52 with the fabrication of the optical compensation structure. Depending on the structure, the materials and methods used for its fabrication may vary. For example, it is often convenient to fabricate the optical compensation structures using techniques and methods compatible with the manufacturing of the individually addressable light-modulating elements, e.g., by spin coating and/or chemical vapor deposition techniques. For example, a diffuser film may be fabricated by spin-coating the substrate using a polymer or polymer solution that contains scattering elements dispersed therein. For example, the polymer may be a polyimide and the scattering elements may be microscopic glass beads. Color filters and black masks may be appropriately dyed photoresist polymers fabricated on the substrate using known photoresist deposition and masking techniques. Black masks may also be inorganic materials such as chrome oxide, also known as black chrome, fabricated on the substrate using known deposition and masking techniques.

The process illustrated in FIG. 8 continues at step 54 with the deposition of a planarization layer. The planarization layer or layers are typically polymers, e.g., polyimide, and may be deposited using known deposition and masking techniques. The deposition of a planarization layer is an optional, but is often preferred because it results in a suitable substrate for subsequent processing steps. The process illustrated in FIG. 8 continues at step 56 with the fabrication of individually addressable light-modulating elements (e.g., interferometric modulator elements) over the optical compensation structure and, if present, the planarization layer. Interferometric modulators are generally fabricated using thin film deposition processes, e.g., as described in U.S. Pat. Nos. 5,835,255 and 6,055,090, and in U.S. Patent Publication No. 2002/0126364 A1. A variation of this process, also illustrated in FIG. 8, involves the fabrication of an additional planarization layer at step 58, followed by the fabrication of an additional optical compensation structure at step 59. After fabrication at step 59, the fabrication process may return to steps 58, 59 for the fabrication of additional planarization layer(s) and optical compensation structure(s), or may proceed to steps 54, 56 for the fabrication of the planarization layer and individually addressable light-modulating elements. Those skilled in the art will understand that the process illustrated in FIG. 8 or variations thereof may be used to fabricate the spatial light modulators described herein, including without limitation the spatial light modulators illustrated in FIGS. 5-7. Means for modulating light transmitted through the transparent substrate include interferometric modulators and liquid crystal displays.

Figure 9:
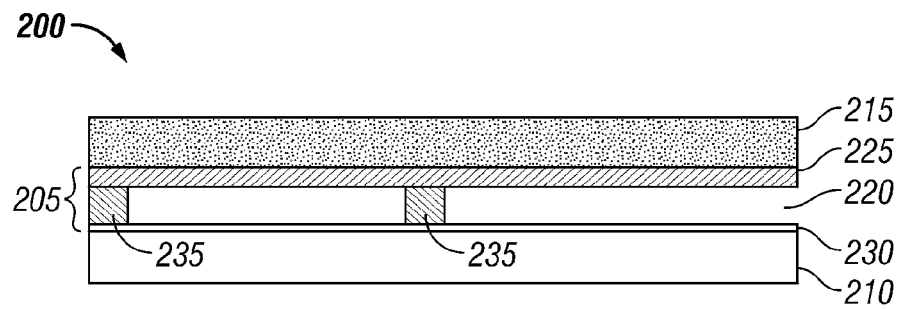
FIG. 9 illustrates an embodiment of a spatial light modulator comprising an integrated optical compensation structure.

FIG. 9 illustrates an embodiment of a spatial light modulator 200 in which a light modulating element 205 is arranged between a substrate 210 and an optical compensation structure 215. In the embodiment illustrated in FIG. 9, the light-modulating element 205 is an interferometric modulator comprising a cavity 220, a movable wall 225, an optical stack 230, and supports 235. The optical stack 230 is on the wall of the cavity 220 that is opposite to the movable wall 225. The optical compensation structure 215 may be any of the optical compensation structures described herein, e.g., an active optical compensation structure that supplies a supplemental frontlighting source, and/or a passive optical compensation structure, e.g., an anti-reflective layer, a diffractive optical element, a structure that scatters light, a black mask, a color filter, a diffuser, a microlens array, a holographic film that mitigates a shift in reflected color with respect to an angle of incidence of the light transmitted through the substrate, or a combination thereof In FIG. 9, the light-modulating element 205 comprises an interferometric modulator, but other spatial light modulators may also be used.

A spatial light modulator in which a light modulating element is arranged between a substrate and an optical compensation structure (such as that illustrated in FIG. 9) may be fabricated by a process similar to that illustrated in FIG. 8, except that the individually addressable light-modulating elements are fabricated over the substrate, followed by fabrication of the optical compensation structure(s) over the individually addressable light-modulating elements (e.g., step 56 in FIG. 8 is conducted after step 50 and prior to step 52). Optionally, a planarization layer may be fabricated over the over the individually addressable light-modulating elements, followed by fabrication of the optical compensation structure(s) over the planarization layer.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A spatial light modulator comprising:
a substrate;
a plurality of light-modulating elements over the substrate, the light-modulating elements configured to interferometrically modulate light transmitted through the substrate;
a first optical compensation structure under the substrate;
a second optical compensation structure between the substrate and the light-modulating elements, at least a portion of the second optical compensation structure, facing the plurality of light-modulating elements, being non-planar; and
a planarization layer between the second optical compensation structure and the plurality of light-modulating elements, the planarization layer contacting the non-planar portion of the second optical compensation structure.

2. The spatial light modulator of claim 1, wherein the substrate is transparent to light.

3. The spatial light modulator of claim 1, wherein the first optical compensation structure comprises a diffuser.

4. The spatial light modulator of claim 1, wherein the second optical compensation structure comprises a plurality of scattering elements.

5. The spatial light modulator of claim 1, wherein the second optical compensation structure comprises a microlens array.

6. The spatial light modulator of claim 1, wherein the second optical compensation structure comprises a diffractive optical element.

7. The spatial light modulator of claim 1, wherein the second optical compensation structure comprises a scattering element.

8. The spatial light modulator of claim 1, wherein the first optical compensation structure is a passive optical compensation structure.

9. The spatial light modulator of claim 1, wherein the second optical compensation structure is a passive optical compensation structure.

10. The spatial light modulator of claim 1, wherein the second optical compensation structure comprises one or more of the group consisting of a plurality of scattering elements, a microlens array, a diffuser, a black mask, and a diffractive optical element.

11. The spatial light modulator of claim 10, wherein the first optical compensation structure comprises one or more of the group consisting of a diffuser, a color filter, a black mask, a plurality of scattering elements, a microlens array, a holographic film, and a diffractive optical element.

12. The spatial light modulator of claim 1, wherein the light-modulating elements each comprise a cavity and a movable wall comprising a reflective metal.

13. The spatial light modulator of claim 1, wherein the first optical compensation structure is configured to have a different optical effect than the second optical compensation structure.

14. The spatial light modulator of claim 1, wherein the first optical compensation structure is substantially non-planar.

15. The spatial light modulator of claim 1, wherein the second optical compensation structure is between the light-modulating elements and a viewer of the spatial light modulator.

16. The spatial light modulator of claim 1, wherein the second optical compensation structure is between the light-modulating elements and a front surface of the spatial light modulator.

17. The spatial light modulator of claim 1, wherein the planarization layer forms a support layer for subsequent fabrication steps.

18. The spatial light modulator of claim 1, wherein the planarization layer is fabricated on the second optical compensation structure by a thin film deposition process.

19. A spatial light modulator comprising:
a substrate;
a plurality of light-modulating elements over the substrate, the light-modulating elements configured to interferometrically modulate light transmitted through the substrate;
a first optical compensation structure under the substrate;
a second optical compensation structure having a non-planar portion and arranged between the substrate and the light-modulating elements, wherein the second optical compensation structure comprises one or more of the group consisting of a plurality of scattering elements, a microlens array, a diffuser, and a diffractive optical element; and a planarization layer between the second optical compensation structure and the plurality of light-modulating elements, the planarization layer in contact with the non-planar portion of the second optical compensation structure.

20. The spatial light modulator of claim 19, wherein the second optical compensation structure is between the light-modulating elements and a viewer of the spatial light modulator.

21. The spatial light modulator of claim 19, wherein the second optical compensation structure is between the light-modulating elements and a front surface of the spatial light modulator.

22. The spatial light modulator of claim 19, wherein the light-modulating elements each comprise a cavity and a movable wall comprising a reflective metal.

23. The spatial light modulator of claim 19, wherein the planarization layer forms a support layer for subsequent fabrication steps.

24. The spatial light modulator of claim 19, wherein the planarization layer is fabricated on the second optical compensation structure by a thin film deposition process.

25. The spatial light modulator of claim 19, wherein the second optical compensation structure comprises a plurality of scattering elements.

26. The spatial light modulator of claim 19, wherein the second optical compensation structure comprises a microlens array.

27. The spatial light modulator of claim 19, wherein the second optical compensation structure comprises a diffuser.

28. The spatial light modulator of claim 19, wherein the second optical compensation structure comprises a diffractive optical element.

29. A spatial light modulator comprising:

a substrate;

a plurality of light-modulating elements over the substrate, the light-modulating elements configured to interferometrically modulate light transmitted through the substrate;

a first optical compensation structure under the substrate;

a second optical compensation structure arranged between the substrate and the light-modulating elements, wherein the first optical compensation structure is configured to achieve a different optical effect than the second optical compensation structure; and a planarization layer between the second optical compensation structure and the plurality of light-modulating elements, the planarization layer in contact with a non-planar portion of the second optical compensation structure.

30. The spatial light modulator of claim 29, wherein the second optical compensation structure is between the light-modulating elements and a viewer of the spatial light modulator.

31. The spatial light modulator of claim 29, wherein the second optical compensation structure is between the light-modulating elements and a front surface of the spatial light modulator.

32. The spatial light modulator of claim 29, wherein the light-modulating elements each comprise a cavity and a movable wall comprising a reflective metal.

33. The spatial light modulator of claim 29, wherein the planarization layer forms a support layer for subsequent fabrication steps.

34. The spatial light modulator of claim 29, wherein the planarization layer is fabricated on the second optical compensation structure by a thin film deposition process.

* * * * *

UNITED STATES PATENT AND TRADEMARK OFFICE
CERTIFICATE OF CORRECTION

PATENT NO.        : 8,045,252 B2
APPLICATION NO.   : 12/034499
DATED             : October 25, 2011
INVENTOR(S)       : Clarence Chui et al.

It is certified that error appears in the above-identified patent and that said Letters Patent is hereby corrected as shown below:

Title page 7, column 1, line 29, please delete "Quanum" and insert therefore, --Quantum--.

Title page 7, column 1, line 38, please delete "Micromaching" and insert therefore, --Micromachining--.

Title page 7, column 1, line 42, please delete "Rosonator" and insert therefore, --Resonator--.

Title page 7, column 2, line 9, please delete "Elctrode" and insert therefore, --Electrode--.

Title page 8, column 1, line 33, please delete "10/244,243," and insert therefore, --10/249,243,--.

Title page 8, column 1, line 36, please delete "10/244,243," and insert therefore, --10/249,243,--.

Title page 8, column 1, line 36, please delete "2007." and insert therefore, --2006.--.

Title page 8, column 1, line 37, please delete "10/244,243," and insert therefore, --10/249,243,--.

Title page 8, column 1, line 39, please delete "10/244,243," and insert therefore, --10/249,243,--.

Title page 8, column 1, line 42, please delete "10/244,243," and insert therefore, --10/249,243,--.

Title page 8, column 1, line 43, please delete "10/244,243," and insert therefore, --10/249,243,--.

Signed and Sealed this
Tenth Day of July, 2012

David J. Kappos
*Director of the United States Patent and Trademark Office*

CERTIFICATE OF CORRECTION (continued)
U.S. Pat. No. 8,045,252 B2

Title page 8, column 1, line 46, please delete "10/244,243," and insert therefore, --10/249,243,--.

Title page 8, column 1, line 47, please delete "10/244,243," and insert therefore, --10/249,243,--.

Title page 8, column 2, line 19, please delete "Graps" and insert therefore, --Grabs--.

At column 4, line 23, please delete "comers" and insert therefore, --corners--.

At column 11, line 21, please delete "thereof" and insert therefore, --thereof.--.

At column 12, line 25, in Claim 10, please delete "a black mask,".